United States Patent
Omae et al.

(10) Patent No.: US 7,801,070 B2
(45) Date of Patent: Sep. 21, 2010

(54) MOBILE COMMUNICATION SYSTEM, MOBILE TERMINAL TRANSFER DEVICE, AND MOBILE COMMUNICATION METHOD

(75) Inventors: Koji Omae, Yokohama (JP); Ryoichi Kobayashi, Yokosuka (JP); Hideaki Takahashi, Yokohama (JP); Takehiro Ikeda, Yokosuka (JP); Masahiro Inoue, Yokosuka (JP); Ichiro Okajima, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1453 days.

(21) Appl. No.: 10/677,386

(22) Filed: Oct. 3, 2003

(65) Prior Publication Data

US 2004/0072569 A1  Apr. 15, 2004

(30) Foreign Application Priority Data

Oct. 7, 2002  (JP) .............................. 2002-294209

(51) Int. Cl.
*H04B 7/14* (2006.01)
*H04L 12/28* (2006.01)
*H04L 12/56* (2006.01)

(52) U.S. Cl. ............................ 370/315; 370/401; 455/7

(58) Field of Classification Search ................. 370/310, 370/328, 331, 338, 315, 392, 395.52, 401, 370/475; 455/436, 445, 7, 561
See application file for complete search history.

(56) References Cited

U.S. PATENT DOCUMENTS

| | | | |
|---|---|---|---|
| 6,507,589 B1 * | 1/2003 | Ramasubramani et al. | 370/465 |
| 6,832,087 B2 * | 12/2004 | Gwon et al. | 455/436 |
| 6,947,401 B2 * | 9/2005 | El-Malki et al. | 370/331 |
| 7,027,432 B2 * | 4/2006 | Carolan et al. | 370/352 |

(Continued)

FOREIGN PATENT DOCUMENTS

WO  WO 02/073999  9/2002

OTHER PUBLICATIONS

S. Aladdin, Proceedings Ninth IEEE International Conference on Networks, XP-010565491, pp. 8-13, "Applied Inter-Working in Drive a Next Generation Multi-Access Approach", Oct. 10, 2001.

(Continued)

*Primary Examiner*—Nguyen Vo
(74) *Attorney, Agent, or Firm*—Oblon, Spivak, McClelland, Maier & Neustadt, L.L.P.

(57) ABSTRACT

A mobile communication system comprises a plurality of transfer devices configured to transfer packets to a visited position of a mobile terminal, a plurality of connection management devices arranged in a network and configured to connect to the mobile terminal, and a mobile terminal including a detection unit configured to detect the transfer device, and a communication unit configured to connect to the connection management device, and transmit/receive packets to/from the transfer device detected by the detection unit via the connection management device.

2 Claims, 22 Drawing Sheets

U.S. PATENT DOCUMENTS

| | | | |
|---|---|---|---|
| 2001/0046223 A1 | 11/2001 | Malki et al. | |
| 2002/0126642 A1* | 9/2002 | Shitama | 370/338 |
| 2003/0065749 A1* | 4/2003 | Gailey et al. | 709/219 |
| 2003/0087646 A1* | 5/2003 | Funato et al. | 455/456 |
| 2005/0153725 A1* | 7/2005 | Naghian et al. | 455/520 |
| 2006/0023662 A1* | 2/2006 | Inoue | 370/328 |
| 2007/0104105 A1* | 5/2007 | MeLampy et al. | 370/235 |
| 2008/0089257 A1* | 4/2008 | Markki et al. | 370/310 |

OTHER PUBLICATIONS

V. L. L. Thing, et al., 2002 The 4th International Workshop on Mobile and Wireless Communications Network (CAT. No. 02EX614), MWCN 2002—4th IEEE Conference on Mobile and Wireless Communications Networks, pp. 465-469, XP-010611893, "Designs and Analysis of Local Mobility Agents Discovery, Selection and Failure Detection for Mobile IPV6", Sep. 9, 2002.

* cited by examiner

FIG.5

MAP(k)

16k

| IP ADDRESS | DELAY VALUE (msec) | PROCESSING CAPABILITY | LIFETIME (sec) | SEQUENCE NUMBER 1 |
|---|---|---|---|---|
| k | 0 | 10(MEDIUM) | 635 | 1653 |
| f | 6.5 | 11(LOW) | 433 | 1652 |
| i | 6.8 | 01(HIGH) | 122 | 1650 |
| n | 7.3 | 10(MEDIUM) | 61 | 1649 |
| g | 13.0 | 00(HIGHEST) | 122 | 1650 |

15a

| SEQUENCE NUMBER 2 | 1653 |
|---|---|
| INITIAL LIFETIME(sec) | 900 |
| SEARCH LIFETIME(sec) | 60 |
| PROCESSING CAPABILITY | 10(MEDIUM) |
| TIMER(sec) | 111.5265 |
| SMOOTHING FACTOR $\alpha$ | 0.5 |

| IP ADDRESS | DELAY VALUE (msec) | PROCESSING CAPABILITY | LIFETIME (sec) | SEQUENCE NUMBER 1 | COMMUNICATIONS CARRIER |
|---|---|---|---|---|---|
| g | 3.3 | 00(HIGHEST) | 22 | 667 | CARRIER A |
| i | 6.3 | 01(HIGH) | 22 | 667 | CARRIER A |
| k | 8.1 | 10(MEDIUM) | 16 | 662 | CARRIER A |
| h | 8.9 | 00(HIGHEST) | 18 | 663 | CARRIER A |
| n | 9.9 | 10(MEDIUM) | 18 | 663 | CARRIER A |

25a

| SEQUENCE NUMBER 2 | 667 |
|---|---|
| INITIAL LIFETIME(sec) | 30 |
| SEARCH LIFETIME(sec) | 15 |
| TIMER(sec) | 52.0121 |
| SMOOTHING FACTOR $\beta$ | 0 |

| |
|---|
| VERSION = 6<br>SOURCE ADDRESS = i<br>DESTINATION ADDRESS = MN | 51i |
| TYPE = 33<br>SEQUENCE NUMBER = 668<br>SEARCH START TIME = 53.0121<br>DELAY VALUE 1 = 8.1<br>DELAY VALUE 2 = 6.8<br>PROCESSING CAPABILITY = 01(HIGH)<br>COMMUNICATIONS CARRIER = CARRIER A | 52i |

| |
|---|
| VERSION = 6<br>SOURCE ADDRESS = f<br>DESTINATION ADDRESS = MN | 51f |
| TYPE = 33<br>SEQUENCE NUMBER = 668<br>SEARCH START TIME = 53.0121<br>DELAY VALUE 1 = 8.1<br>DELAY VALUE 2 = 6.5<br>PROCESSING CAPABILITY = 11(LOW)<br>COMMUNICATIONS CARRIER = CARRIER A | 52f |

| IP ADDRESS | DELAY VALUE (msec) | PROCESSING CAPABILITY | LIFETIME (sec) | SEQUENCE NUMBER 1 | COMMUNICATIONS CARRIER |
|---|---|---|---|---|---|
| g | 3.3 | 00(HIGHEST) | 21 | 667 | CARRIER A |
| i | 6.3 | 01(HIGH) | 21 | 667 | CARRIER A |
| k | 8.0 | 10(MEDIUM) | 30 | 668 | CARRIER A |
| h | 8.9 | 00(HIGHEST) | 17 | 663 | CARRIER A |
| n | 9.9 | 10(MEDIUM) | 17 | 663 | CARRIER A |

25a

| SEQUENCE NUMBER 2 | 668 |
|---|---|
| INITIAL LIFETIME(sec) | 30 |
| SEARCH LIFETIME(sec) | 15 |
| TIMER(sec) | 53.0330 |
| SMOOTHING FACTOR $\beta$ | 0 |

| IP ADDRESS | DELAY VALUE (msec) | PROCESSING CAPABILITY | LIFETIME (sec) | SEQUENCE NUMBER 1 | COMMUNICATIONS CARRIER |
|---|---|---|---|---|---|
| g | 3.3 | 00(HIGHEST) | 21 | 667 | CARRIER A |
| i | 6.0 | 01(HIGH) | 30 | 668 | CARRIER A |
| k | 8.0 | 10(MEDIUM) | 30 | 668 | CARRIER A |
| h | 8.9 | 00(HIGHEST) | 17 | 663 | CARRIER A |
| n | 9.9 | 10(MEDIUM) | 17 | 663 | CARRIER A |

25a

| SEQUENCE NUMBER 2 | 668 |
|---|---|
| INITIAL LIFETIME(sec) | 30 |
| SEARCH LIFETIME(sec) | 15 |
| TIMER(sec) | 53.0419 |
| SMOOTHING FACTOR $\beta$ | 0 |

MOBILE COMMUNICATION SYSTEM, MOBILE TERMINAL TRANSFER DEVICE, AND MOBILE COMMUNICATION METHOD

CROSS REFERENCE TO RELATED APPLICATIONS

This application is based upon and claims the benefit of priority from the prior Japanese Patent Application No. P2002-294209, filed on Oct. 7, 2002; the entire contents of which are incorporated herein by reference.

BACKGROUND OF THE INVENTION

1. Field of the Invention

The present invention relates to a mobile communication system, a mobile terminal, a transfer device, and a mobile communication method.

2. Description of the Related Art

In a conventional mobile communication system, a base station conducts both connection management when a mobile terminal connects to the base station, and mobility management for ensuring mobility of a mobile terminal such as buffering and transfer of packets. Therefore, the base station and mobile terminal are designed and managed so that connection management and mobility management may coexist and be optimized.

Furthermore, in recent years, a mobility management scheme called HMIP (Hierarchical Mobile IPv6) is under consideration In HMIP, an access router for conducting connection management and a mobility anchor point for conducting mobility management are placed at different sites rather than at one site. Therefore, a mobile terminal needs to grasp a mobility anchor point used for mobility management. Accordingly, in an access router, the addresses of mobility anchor points in the neighborhood of the access router are previously set. Further, the mobile terminal is notified by the access router connected thereto of the preset address of the mobility anchor point, and thereby grasps the mobility anchor point.

However, in the case where a base station conducts both connection management and mobility management, a connection management service and a mobility management service are provided in an integrated manner. Also in HMIP in which an access router for conducting connection management and a mobility anchor point for conducting mobility management are placed at different sites, since the address of a mobility anchor point needs to be set in the access router, a connection management service and a mobility management service are provided in an integrated manner.

As a result, a user of the mobile terminal has a problem of small flexibility to select a service, because the user must always use the connection management service and mobility management service as a set. Furthermore, a communications carrier that provides services to mobile terminals has also a problem of failing to sufficiently acquire users of the mobility management service, because it can provide the mobility management service only to the users who use the connection management service it provides.

Furthermore, in the case where one attempts to provide a connection management service and a mobility management service separately, the following new problem occurs. Since an access router for providing a connection management service and a mobility anchor point for providing a mobility management service are separately placed and controlled, the address of the mobility anchor point cannot be previously set in the access router. As a result, a mobile terminal cannot be notified the address of the mobility anchor point by the access router. Therefore, the mobile terminal must be able to grasp a transfer device such as a mobility anchor point by itself. Furthermore, the mobility anchor point cannot also cause the access router to notify the mobile terminal of the address of the mobility anchor point. Therefore, a transfer device such as a mobility anchor point must be able to make the existence of the mobility anchor point known to a mobile terminal by itself.

Furthermore, a transfer device for conducting mobility management such as a mobility anchor point must be able to provide a mobility management service such as transfer of packets only to the mobile terminals used by subscribers of the mobility management service.

BRIEF SUMMARY OF THE INVENTION

An object of the present invention is to enable a connection management service and a mobility management service to be separately provided.

A mobile communication system according to the present invention comprises a plurality of transfer devices configured to transfer packets to a visited position of a mobile terminal, a plurality of connection management devices arranged in a network and configured to connect to the mobile terminal, and the mobile terminal including a detection unit configured to detect the transfer device and a communication unit configured to connect to the connection management device, and transmit/receive packets to/from the transfer device detected by the detection unit via the connection management device.

Furthermore, a mobile terminal according to the present invention comprises a detection unit configured to detect a transfer device transferring packets to a visited position of the mobile terminal, and a communication unit configured to connect to a connection management device arranged in a network and connecting to the mobile terminal, and transmit/receive packets to/from the transfer device detected by the detection unit via the connection management device.

According to the mobile communication system and the mobile terminal as described above, the detection unit detects a transfer device. Further, the communication unit connects to a connection management device and transmits/receives packets to/from the transfer device detected by the detection unit. Therefore, the mobile terminal can detect and grasp a transfer device by itself. Further, the mobile terminal can transmit/receive packets to/from the detected transfer device via the connecting connection management device. Therefore, a connection management service conducted by using a connection management device and a mobility management service conducted by using a transfer device can be separately provided to the mobile terminal.

A transfer device according to the present invention comprises a transfer device information storage unit configured to store addresses of a plurality of transfer devices, a notification packet creation unit configured to acquire the address of the transfer device stored in the transfer device information storage unit and create a notification packet for notifying the address of the transfer device, and a communication unit configured to transmit/receive packets to/from a mobile terminal, via a connection management device arranged in a network and connecting to the mobile terminal, transmit the notification packet created by the notification packet creation unit, and transfer packets to a visited position of the mobile terminal.

According to the transfer device as described above, the notification packet creation unit creates a notification packet for notifying the transfer device, based on the address of the transfer device stored in the transfer device information storage unit. Further, the communication unit transmits the notification packet to the mobile terminal. Therefore, the transfer unit can make the existence of the transfer unit known to the mobile terminal by itself. Therefore, the transfer device can receive notice of the address indicating the visited position from the mobile terminal, which has notified of its own existence, and can transfer packets to the visited position of the mobile terminal. Therefore, a connection management service conducted by using a connection management device and a mobility management service conducted by using a transfer device can be separately provided to the mobile terminal.

Another transfer device according to the present invention comprises a communication unit configured to transmit/receive packets to/from a mobile terminal via a connection management device arranged in a network and connecting to the mobile terminal, and transfer packets to a visited position of the mobile terminal, a determination unit configured to determine whether a packet received by the communication unit is a packet from a mobile terminal allowed to use packet transfer performed by the transfer device, and a transfer management unit configured to manage transfer of packets to the visited position based on a determination result by the determination unit.

According to the transfer device as described above, the determination unit determines whether a received packet is a packet from a mobile terminal allowed to use packet transfer performed by the transfer device. Further, the transfer management unit manages transfer of packets to the visited position of the mobile terminal, based on the determination result. Therefore, the transfer device can conduct packet transfer to the visited position only for such mobile terminals allowed to use packet transfer performed by the transfer device as mobile terminals used by the subscribers of the mobility management service. Accordingly, the mobility management service can be provided only to the subscribers of the mobility management service. Therefore, a connection management service conducted by using a connection management device and a mobility management service conducted by using a transfer device can be separately provided to the mobile terminal.

A mobile communication method according to the present invention comprises detecting a transfer device transferring packets to a visited position of a mobile terminal, by the mobile terminal, connecting to a connection management device arranged in a network and connecting to the mobile terminal, by the mobile terminal, and transmitting/receiving packets to/from a detected transfer device via the connection management device, by the mobile terminal.

Another mobile communication method according to the present invention comprises, determining whether a packet received from a mobile terminal via a connection management device arranged in a network and connecting to the mobile terminal is a packet from a mobile terminal allowed to use packet transfer performed by a transfer device transferring packets to a visited position of the mobile terminal, and managing transfer of packets to the visited position based on a determination result, by the transfer device.

BRIEF DESCRIPTION OF THE SEVERAL VIEWS OF THE DRAWINGS

FIG. 5 is a diagram showing a neighbor MAP table and a second table in a MAP(k) according to the first embodiment of the present invention;

FIG. 6 is a diagram showing a neighbor MAP table and a second table in a MN according to the first embodiment of the present invention;

FIGS. 10A and 10B are diagrams showing MAP notification packets according to the first embodiment of the present invention;

FIG. 11 is a diagram showing a neighbor MAP table and a second table in a MN when receiving a MAP notification packet from a MAP(i), according to the first embodiment of the present invention;

FIG. 12 is a diagram showing a neighbor MAP table and a second table in a MN when receiving a MAP notification packet from a MAP(f), according to the first embodiment of the present invention;

DETAILED DESCRIPTION OF THE INVENTION

First Embodiment

[Mobile Communication System]

Figure 1:
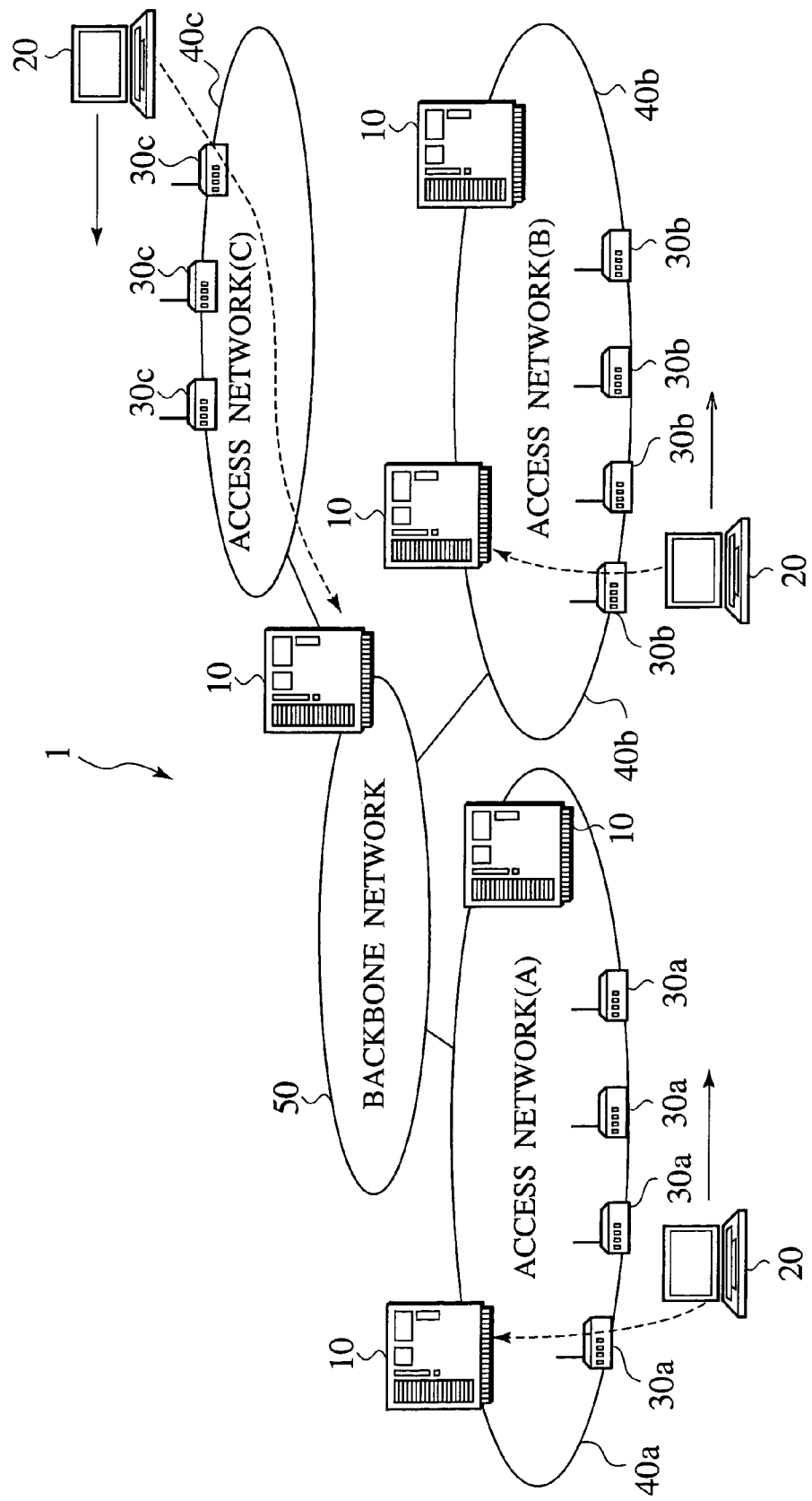
FIG. 1 is a diagram showing a configuration of a mobile communication system according to a first embodiment of the present invention.

As shown in FIG. 1, the mobile communication system 1 comprises a plurality of mobility anchor points (hereafter referred to as MAPs) 10, a plurality of mobile nodes (hereafter referred to as MNs) 20, a plurality of access routers (hereafter referred to as ARs) (A) 30a, a plurality of AR(B)'s 30b, a plurality of AR(C)'s 30c, an access network (A) 40a, an access network (B) 40b, an access network (C) 40c, and a backbone network 50. The mobile communication system 1 uses a mobility management scheme called HMIP (Hierarchical Mobile IPv6).

This mobile communication system 1 is constructed and managed by a communications carrier A (hereafter referred to as Carrier A), communications carrier B (hereafter referred to as Carrier B), and communications carrier C (hereafter referred to as Carrier C). The backbone network 50 is a backbone IP network extending across all the areas. The access network (A) 40a, access network (B) 40b and access network (C) 40c are local IP networks each extending over a part of the areas. The backbone network 50 and access network (A) 40a are constructed and managed by Carrier A. The access network (B) 40b is constructed and managed by Carrier B. The access network (C) 40c is constructed and managed by Carrier C. Incidentally, the access network (A) 40a and access network (B) 40b are networks larger than the access network (C) 40c. The access network (C) 40c is a network smaller than the access network (A) 40a and access network (B) 40b.

Carrier A provides a connection management service for the MN 20 to connect to the network (A) 40a. Furthermore, Carrier A provides a mobility management service such as transfer of packets to a visited position of the MN 20 and buffering of packets for ensuring that the MN 20 can receive packets even if it moves. Carrier B provides a connection management service for the MN 20 to connect to the network (B) 40b. Carrier C provides a connection management service for the MN 20 to connect to the network (C) 40c. Therefore, Carrier A arranges a plurality of AR(A)'s 30a in the access network (A) 40a for providing a connection management service. Furthermore, Carrier A arranges a plurality of MAPs 10 in the access network (A) 40a, in the access network (B) 40b, and at a boundary between the access network (C) 40c and backbone network 50.

In this case, Carrier A pays an arrangement toll to Carrier B to get permission to arrange a MAP 10 in the access network (B) 40b. Carrier B arranges a plurality of AR(B)'s 30b in the access network (B) 40b for providing a connection management service. Carrier C arranges a plurality of AR(C)'s 30c in the access network (C) 40c for providing a connection management service.

In the present embodiment, the user of the MN 20 has a contract with Carrier A for using a mobility management service. Furthermore, the user of the MN 20 has a contract with Carrier A, Carrier B and Carrier C for using a connection management service. Therefore, in the access network (A) 40a, the MN 20 can connect to the AR(A) 30a and receive the connection management service. The MN 20 can receive the mobility management service using a MAP 10 of Carrier A arranged in the access network (A) 40a. Furthermore, in the access network (B) 40b, the MN 20 can connect to the AR(B) 30b and receive the connection management service. The MN 20 can receive the mobility management service using a MAP 10 of Carrier A arranged in the access network (B) 40b. Furthermore, in the access network (C) 40c, the MN 20 can connect to the AR(C) 30c and receive the connection management service. The MN 20 can receive the mobility management using a MAP 10 of Carrier A arranged at the boundary of the access network (C) 40c and backbone network 50.

The MAP 10 is a transfer device for conducting mobility management to transfer packets to a visited position of the MN 20. When the MN 20 conducts handoff, the MAP 10 also conducts receiving and temporarily buffering of packets directed to the MN 20, and transferring of them to the visited position after the handoff. The MAP 10 can improve quality of the mobility management service by buffering. Incidentally, the MAP 10 needs not necessarily buffering.

In order to conduct such transfer of packets to the MN 20, the MAP 10 stores binding information. Specifically, the MAP 10 receives from the MN 20 a packet for notifying a terminal care of address, which indicates a visited position of the MN 20 (hereafter referred to as binding update packet). For example, the MAP 10 receives from the MN 20 a binding update packet for notifying a home address which is a unique IP address assigned to the MN 20, and a terminal care of address which indicates the visited position of the MN 20. Here, in the terminal care of address, which indicates the visited position of the MN 20, there is a on link care of address (hereafter referred to as LCoA). The LCoA is created from a network prefix of the IP address of the AR to which the MN 20 connects, and a host identity of the IP address assigned to the MN 20. In this case, the MAP 10 binds the home address and LCoA of the MN 20 with each other, and stores the binding as binding information.

Or the MAP 10 may receive from the MN 20 a binding update packet for notifying a network care of address which includes data specifying a network in which a MAP 10 used by the MN 20 for transfer of packets exists, and the terminal care of address. Here, in the network care of address, there is a regional care of address (hereafter referred to as RCoA). The RCoA is created from a network prefix of the IP address of the MAP 10 used by the MN 20 for transfer of packets, and the host identity of the IP address assigned to the MN 20. In this case, the MAP 10 binds the RCoA and LCoA of the MN 20 with each other, and stores the binding as binding information. Furthermore, the MAP 10 also receives from the MN 20 a buffering request packet for requesting buffering of packets and a buffering cancellation packet for canceling buffering.

The MAP 10 grasps MAPs located in its own neighborhood (hereafter referred to as neighbor MAPs) by searching and detecting other MAPs. The MAP 10 notifies the MN 20 of the address of the MAP 10 and makes the existence of the MAP 10 known to the MN 20. Furthermore, the MAP 10 determines whether a packet received from a MN 20 is a packet from a MN 20 allowed to use packet transfer performed by the MAP 10, and authenticates it. In other words, a determination is made whether it is a packet from a MN 20 used by a subscriber who has made a contract with Carrier A for using a mobility management service. Then, only if it is a packet from a MN 20 allowed to use packet transfer, the MAP 10 transfers the packet to a visited position of the MN 20, which has transmitted the packet.

MAPs 10 are arranged according to the size of the access network. In the case of a large network like the access network (A) 40a and access network (B) 40b, MAPs 10 are arranged in the access network (A) 40a and in the access network (B)

40b, in a distributed manner as shown in FIG. 1. As a result, since a MAP 10 can be near the MN 20 even in a large network, the delay value in packet transfer between the MAP 10 and MN 20 can be reduced.

On the other hand, in the case of a small network like the access network (C) 40c, a MAP 10 is arranged at the boundary between the access network (C) 40c and backbone network 50, which is outside the access network (C) 40c, as shown in FIG. 1. In the case of this access network (C) 40c, since the network is small, the MAP 10 can be located near the MN 20, and the delay value in packet transfer between the MAP 10 and MN 20 can be sufficiently reduced, even if the MAP 10 is arranged outside the access network (C) 40c. In this case, since Carrier A does not need to pay an arrangement toll to Carrier C for getting permission to arrange a MAP 10 in the access network (C) 40c, the arrangement cost can be reduced. In this way, by arranging MAPs 10 according to the size of the network, they can be suitably arranged so that the delay value in packet transfer between the MAP 10 and MN 20 may not become large, and the performance of mobility management can be improved.

The AR(A) 30a to AR(C) 30c are connection management devices, which connect to the MN 20. The AR(A) 30a to AR(C) 30c connect to the MN 20 via radio links. The AR(A) 30a to AR(C) 30c manage handoff, which the MN 20 moves and switches ARs to which it connects. The AR(A) 30a to AR(C) 30c receive a packet transmitted from the MN 20 connecting to the AR itself via a radio link, and transfer it to a MAP 10 used by the MN 20. Furthermore, the AR(A) 30a to AR(C) 30c receive a packet directed to the MN 20 connecting to the AR itself via radio link, from a MAP 10 used by the MN 20, and transmit it to the MN 20. Incidentally, the AR(A) 30a to AR(C) 30c connect only to the MN 20 used by a subscriber who has made a contract for using an connection management service with Carrier A to Carrier C, respectively. Furthermore, as shown in FIG. 1, the AR(A) 30a to AR(C) 30c are arranged in the access network (A) 40a to access network (C) 40c, respectively, in a distributed manner.

The MN 20 is a mobile terminal, which connects to the AR(A) 30a to AR(C) 30c, and transmits/receives packets to/from a MAP 10, via the AR(A) 30a to AR(C) 30c connecting as represented by a dot line in FIG. 1. The MN 20 connects to the AR(A) 30a to AR(C) 30c via a radio link. Incidentally, the MN 20 connects to the AR(A) 30a to AR(C) 30c of Carrier A to Carrier C, respectively, with which it has made a contract for using an connection management service. The MN 20 grasps neighbor MAPs by searching and detecting MAPs 10. From among them, the MN 20 selects a MAP 10 to use for transfer of packets, and transmits a binding update packet to the selected MAP 10. Specifically, the MN 20 transmits a binding update packet for notifying the MAP 10 of the home address and LCoA of the MN 20, or a binding update packet for notifying the MAP 10 of the RCoA and LCoA of the MN 20. Furthermore, the MN 20 also transmits a buffering request packet and buffering cancellation packet to the selected MAP 10. Incidentally, the MN 20 transmits the binding update packet and buffering request packet to the MAP 10 of Carrier A with which it has made a contract for using a mobility management service.

Here, there are various criteria for determining whether the distance between nodes is short, for example between a MAP 10 and MN 20, and between a MAP 10 and other MAP 10. Therefore, the neighbor MAP means a nearby MAP, but may differ depending upon the decision criterion. For example, there are various decision criteria as to whether the distance between nodes is short, such as a shorter delay value in packet transmission between nodes, a smaller number of hops between nodes, a lower cost in packet transmission between nodes, a larger link capacity between nodes, a better propagation path between nodes, a larger processing capability of the node, a smaller traffic volume in the node, a smaller number of nodes using the node, and a lower transmission power of the node, a higher reliability of the node, all of which indicate a shorter distance. Furthermore, as for the decision criterion, a plurality of parameters for criterion may also be combined. Incidentally, as the decision criterion as to whether the distance between nodes is short, a suitable criterion can be used for a node. Furthermore, for the decision criterion as to whether the distance is short, various decision criteria can be used depending upon the routing protocol adopted by the mobile communication system 1.

Since there are various decision criteria as to whether the distance between nodes is short, there are various kinds of information required for the decision as to whether the distance between nodes is short (hereafter referred to as remoteness/nearness decision information). For example, in the remoteness/nearness decision information, there are the delay value in packet transmission between nodes, the number of hops between nodes, the cost in packet transmission between nodes, the link capacity between nodes, the propagation path information between nodes, the processing capability of the node, the traffic volume of the node, the number of nodes using the node, the transmission power of the node, and the reliability of the node. In the present embodiment, a decision criterion that a smaller delay value in packet transmission between nodes indicates a shorter distance is used as the decision criterion for determining whether the distance between nodes is short. Furthermore, as the remoteness/nearness decision information, the delay value in packet transmission between nodes is used.

(MAP)

Figure 2:
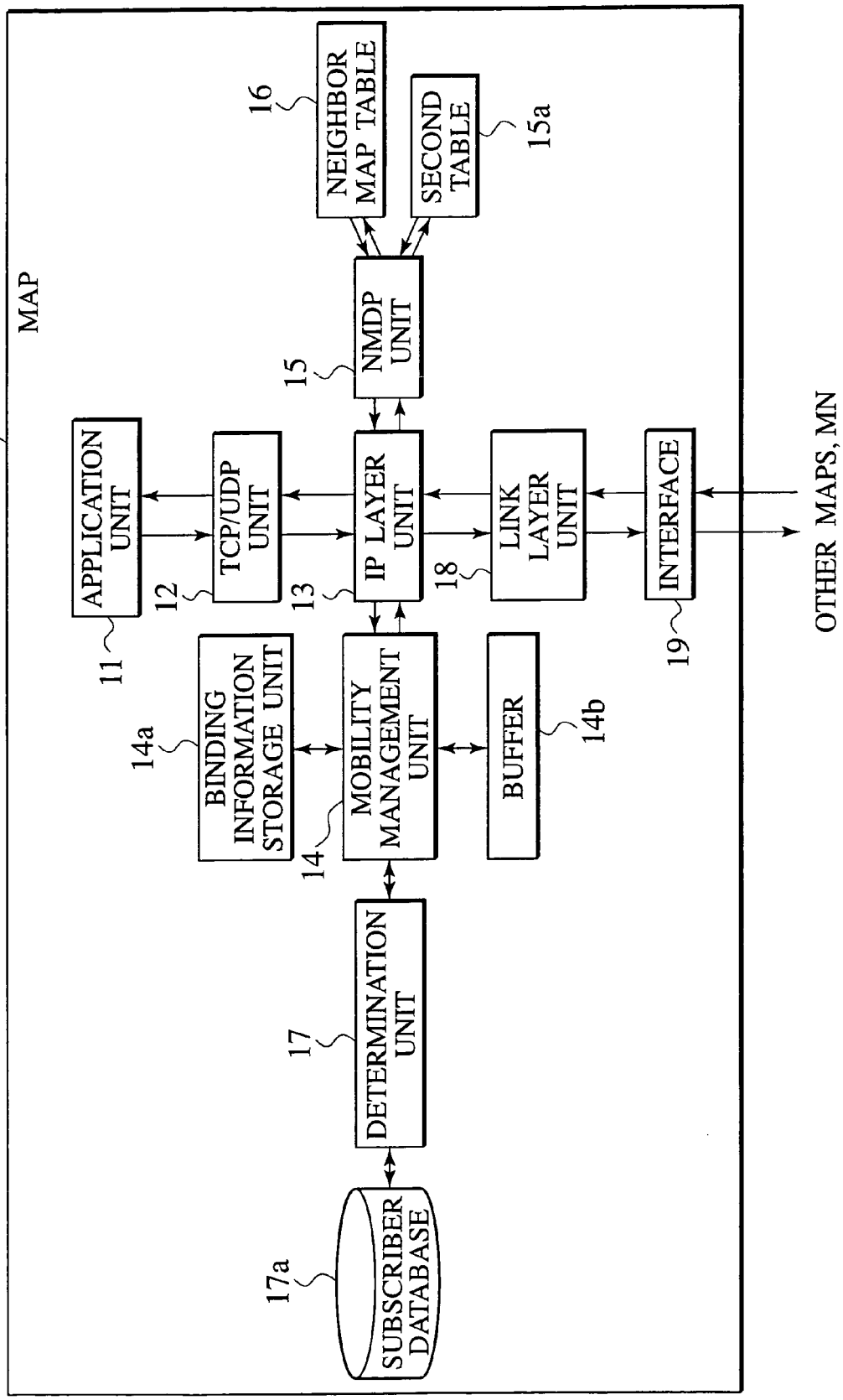
FIG. 2 is a block diagram showing a configuration of a MAP according to the first embodiment of the present invention.

The MAP 10 will now be described with reference to FIG. 2. As shown in FIG. 2, the MAP 10 comprises an application unit 11, a TCP/UDP (Transmission Control Protocol/User Data gram Protocol) unit 12, an IP layer unit 13, a mobility management unit 14, a binding information storage unit 14a, a buffer 14b, an NMDP (Neighbor MAP Discovery Protocol) unit 15, a second table 15a, a neighbor MAP table 16, a determination unit 17, a subscriber database 17a, a link layer unit 18, and an interface 19.

The application unit 11 has various applications installed therein. The application unit 11 inputs data to the TCP/UDP unit 12, and acquires data from the TCP/UDP unit 12. The TCP/UDP unit 12 conducts control of the TCP/UDP level. The TCP/UDP unit 12 adds a TCP/UDP header to the data acquired from the application unit 11, and inputs resultant data to the IP layer unit 13. Furthermore, the TCP/UDP unit 12 removes a TCP/UDP header from data acquired from the IP layer unit 13, and supplies resultant data to a suitable application in the application unit 11 according to the content of the data.

The IP layer unit 13 conducts control of the IP level. The IP layer unit 13 adds an IP header to the data with the TCP/UDP header added thereto acquired from the TCP/UDP unit 12, and inputs resultant data to the link layer unit 18. Furthermore, the IP layer unit 13 removes an IP header from the data acquired from the link layer unit 18, and inputs resultant data to the TCP/UDP unit 12.

Furthermore, the IP layer unit 13 acquires from the link layer unit 18 a packet for mobility management, such as a binding update packet, buffering request packet and buffering cancellation packet from the MN 20 to the MAP 10, a packet directed to a home address of the MN 20, or a packet directed to a RCoA of the MN 20, and inputs the packet to the mobility management unit 14. Furthermore, the IP layer unit 13 acquires from the mobility management unit 14 a response packet in response to a binding update packet (hereafter referred to as binding update ACK packet) from the MAP 10 to the MN 20, or a packet encapsulated by a header with its destination address being a LCoA, and inputs the packet to the link layer unit 18.

Furthermore, the IP layer unit 13 acquires a MAP notification packet for notifying the address of a MAP 10, a MAP notification initiator packet or a MAP query packet from the link layer unit 18, and inputs it to the NMDP unit 15. Furthermore, the IP layer unit 13 acquires a MAP notification packet, MAP notification initiator packet or MAP query packet from the NMDP unit 15, and inputs it to the link layer unit 18. Here, the MAP notification packet is a notification packet for notifying an address of a transfer device, that is, a packet for notifying an address of a MAP 10 as a transfer device. The MAP notification initiator packet is a notification initiator packet for requesting other transfer device to transmit a notification packet, that is, a packet for requesting a MAP 10 as a transfer device to transmit a MAP notification packet. The MAP query packet is a packet for searching for a transfer device, that is, a packet for searching for a MAP 10 as a transfer device.

The mobility management unit 14 is a transfer management unit configured to manage transfer of packets to a visited position of the MN 20. The binding information storage unit 14a stores binding information required when the mobility management unit 14 manages transfer of packets. The buffer 14b temporarily stores packets directed to the MN 20.

Specifically, first, the mobility management unit 14 acquires from the IP layer unit 13 a packet concerning mobility management such as a binding update packet or buffering request packet transmitted from the MN 20. The mobility management unit 14 temporarily inputs the acquired packet concerning mobility management to the determination unit 17, and causes it to determine whether the packet received by the MAP 10 is a packet from a MN 20 allowed to use packet transfer performed by the MAP 10. The packet is returned to the mobility management unit 14 only if the determination result indicates that it is a packet from a MN 20 allowed to use packet transfer.

First, the case where the mobility management unit 14 acquires a binding update packet will be described. The mobility management unit 14 conducts binding of addresses based on the binding update packet. When the mobility management unit 14 acquires from the MN 20 a binding update packet for notifying a home address and LCoA of the MN 20, it binds the home address and LCoA of the MN 20 included in the binding update packet with each other. The mobility management unit 14 records the binding between the home address and LCoA of the MN 20 as binding information in the binding information storage unit 14a.

When the mobility management unit 14 acquires from the MN 20 a binding update packet for notifying a RCoA and LCoA of the MN 20, it binds the RCoA and LCoA of the MN 20 included in the binding update packet with each other. The mobility management unit 14 records the binding between the RCoA and LCoA of the MN 20 as binding information in the binding information storage unit 14a. Finally, the mobility management unit 14 creates a binding update ACK packet that is a response to the binding update packet, and inputs it to the IP layer unit 13.

After such binding of addresses, if the mobility management unit 14 acquires a packet directed to a home address of the MN 20 or a packet directed to a RCoA of the MN 20 from the IP layer unit 13, then it acquires a LCoA bound with the home address or RCoA from the binding information storage unit 14a. Further, the mobility management unit 14 encapsulates the packet directed to the home address of the MN 20 or the packet directed to the RCoA of the MN 20, by using a header with its destination address being the LCoA, and supplies it to the IP layer unit 13. In this way, the mobility management unit 14 functions as a transfer management unit configured to manage transfer of packets to the visited position of the MN 20 based on a determination result of the determination unit 17.

Next, the case where the mobility management unit 14 acquires a buffering request packet will be described. When the mobility management unit 14 acquires a packet from the IP layer unit 13 directed to a home address or the RCoA of the MN 20 for which the buffering request is received, then it conducts temporary buffering by storing the packet in the buffer 14b. Thereafter, the mobility management unit 14 acquires from the IP layer unit 13 a buffering cancellation packet from the MN 20, which has completed handoff. Further, the mobility management unit 14 terminates buffering, and transfers the packet stored in the buffer 14b to a visited position of the MN 20, after handoff. Specifically, the mobility management unit 14 encapsulates the packet stored in the buffer 14b, by using a header with its destination address being the LCoA that indicates the visited position of the MN 20 after handoff, and supplies it to the link layer unit 18. In this way, the mobility management unit 14 also conducts buffering management.

The NMDP unit 15 conducts control for making the existence of the MAP 10 known to the MN 20 by notifying the MN 20 of the address of the MAP 10, or control for supplying information concerning the MAP 10 to the MN 20. Furthermore, the NMDP unit 15 controls the search for and detection of other MAPs. Specifically, the NMDP unit 15 conducts creation and processing of a MAP notification packet, MAP notification initiator packet and MAP query packet. For example, the NMDP unit 15 creates a MAP notification packet, MAP notification initiator packet or MAP query packet based on the neighbor MAP table 16, the second table 15a, and the acquired MAP notification packet, MAP notification initiator packet or MAP query packet, and inputs it to the IP layer unit 13. In other words, the NMDP unit 15 functions as a query packet creation unit configured to create a MAP query packet which is a query packet, a notification packet creation unit configured to create a MAP notification packet which is a notification packet, and an initiator packet creation unit configured to create a MAP notification initiator packet which is a notification initiator packet.

Furthermore, the NMDP unit 15 conducts MAP detection, decision of inter-transfer-device information concerning the relation between MAPs, and update of the neighbor MAP table 16 and second table 15a based on the neighbor MAP table 16, second table 15a, acquired MAP notification packet and the like. In other words, the NMDP unit 15 functions as a detection unit configured to detect other MAPs 10, a decision unit configured to decide inter-transfer-device information, and an update unit configured to update the neighbor MAP table 16 and second table 15a.

The second table 15a stores information required for searching other MAPs 10 and the update of the neighbor MAP table 16, and information on the MAP 10 itself. The neighbor MAP table 16 is a transfer device information storage unit configured to store addresses of a plurality of MAPs 10. The neighbor MAP table 16 stores information concerning a plurality of neighbor MAPs.

The determination unit 17 determines whether a packet received by the interface 19 is a packet from a MN 20 allowed to use packet transfer performed by the MAP 10, and authenticates user. The subscriber database 17*a* is a terminal information storage unit configured to store terminal information unique to each MN 20 allowed to use the packet transfer. For example, when the user of the MN 20 makes a contract with Carrier A for using the mobility management service, the user is assigned a user ID and registers a password. The subscriber database 17*a* stores, for example, a user ID assigned to the user of each MN 20, and a password, which the user of each MN 20 has registered, as the terminal information unique to each MN 20 allowed to use the packet transfer.

The determination unit 17 acquires from the mobility management unit 14 a packet concerning mobility management such as a binding update packet or buffering request packet, which has been transmitted from the MN 20 and received by the interface 19. The determination unit 17 determines whether the received packet is a packet from a MN 20 allowed to use packet transfer performed by the MAP 10, based on whether information such as a user ID or password concerning the MN 20 included in the binding update packet or buffering request packet acquired from the mobility management unit 14 coincides with the terminal information such as a user ID or password unique to each MN 20 allowed to use the packet transfer stored in the subscriber database 17*a*.

As a result of comparing the information such as a user ID or password concerning the MN 20 included in the binding update packet or buffering request packet acquired from the mobility management unit 14, with the terminal information such as a user ID or password unique to each MN 20 allowed to use the packet transfer stored in the subscriber database 17*a*, when they coincide with each other, the determination unit 17 determines that the received packet is a packet from a MN 20 allowed to use packet transfer performed by the MAP 10. In this case, the determination unit 17 returns to the mobility management unit 14 the binding update packet or buffering request packet acquired from the mobility management unit 14. On the other hand, as a result of the comparison, when they do not coincide with each other, the determination unit 17 determines that the received packet is not a packet from a MN 20 allowed to use packet transfer performed by the MAP 10. In this case, the determination unit 17 discards the binding update packet or buffering request packet acquired from the mobility management unit 14. As a result, only when the packet is a packet from a MN 20 allowed to use packet transfer, the MAP 10 can conduct transfer of the packet to a visited position of the MN 20, which has transmitted the packet.

The link layer unit 18 conducts control of the data link level. The link layer unit 18 adds a header of data link level to data having an IP header acquired from the IP layer unit 13, and inputs resultant data to the interface 19. Furthermore, the link layer unit 18 removes a header of data link level from data acquired from the interface 19, and supplies resultant data to the IP layer unit 13.

The interface 19 is a communication unit configured to transmit/receive packets to/from the MN 20 via the AR(A) 30*a* to AR(C) 30*c*. The interface 19 connects to the AR(A) 30*a* to AR(C) 30*c* via a radio link. The interface 19 transmits a binding update ACK packet, a packet encapsulated by a header with its destination address being a LCoA, a MAP notification packet, a MAP notification initiator packet and a MAP query packet to other MAP 10 or the MN 20. Further, the interface 19 inputs a packet received from other MAP 10 or the MN 20 such as a binding update packet, a buffering request packet, a buffering cancellation packet, a packet directed to a home address of the MN 20, a packet directed to a RCoA of the MN 20, a MAP notification packet, a MAP notification initiator packet and a MAP query packet, to the link layer unit 18.

(MN)

Figure 3:
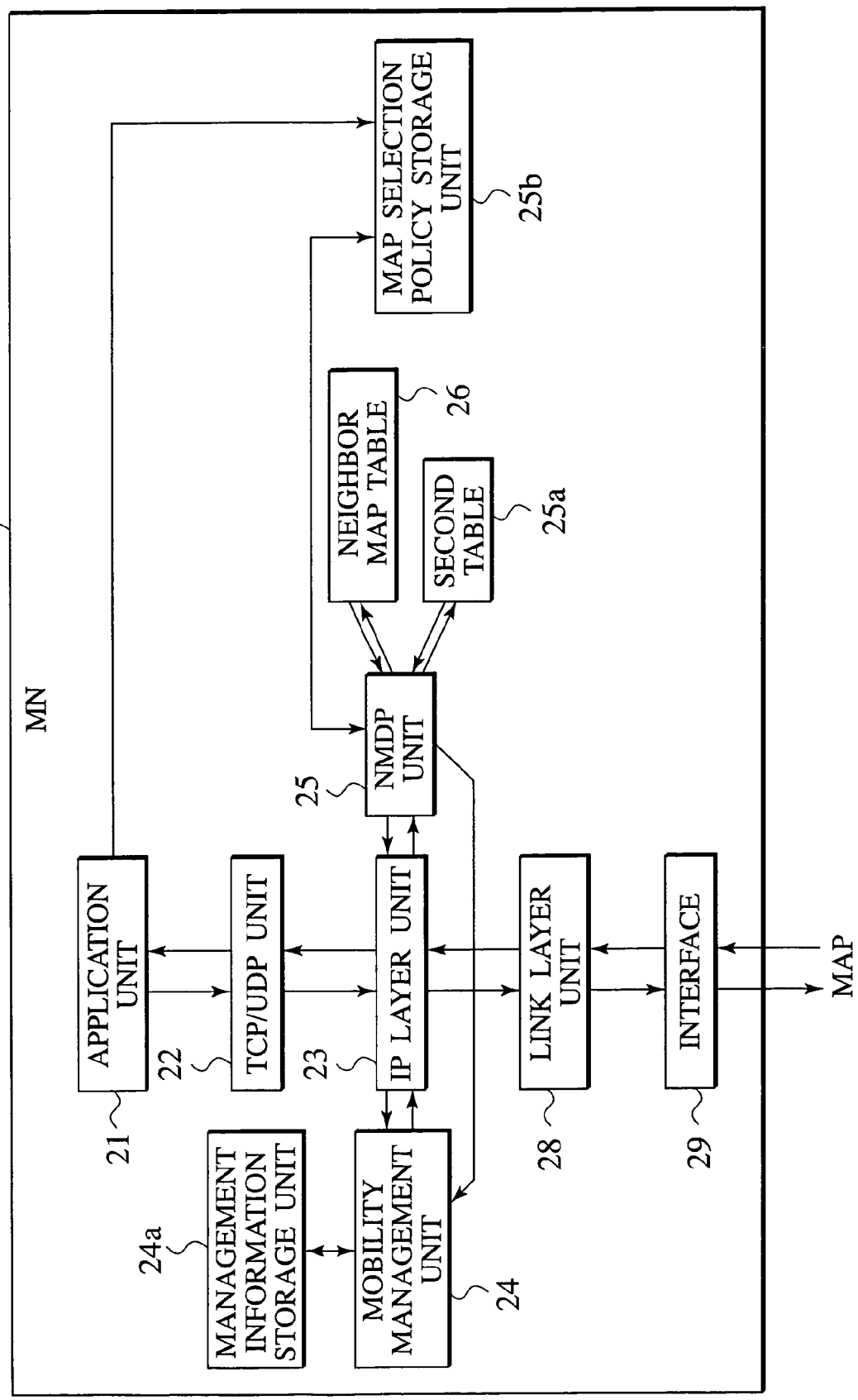
FIG. 3 is a block diagram showing a configuration of a MN according to the first embodiment of the present invention.

The MN 20 will now be described with reference to FIG. 3. As shown in FIG. 3, the MN 20 comprises an application unit 21, a TCP/UDP unit 22, an IP layer unit 23, a mobility management unit 24, a management information storage unit 24*a*, an NMDP unit 25, a second table 25*a*, a MAP selection policy storage unit 25*b*, a neighbor MAP table 26, a link layer unit 28, and an interface 29.

The application unit 21 is generally the same as the application unit 11 in the MAP 10. The application unit 21, however, sets a MAP selection policy. The MAP selection policy is a selection criterion for selecting a MAP 10 to be used by the MN 20 for transfer of packets. The MAP selection policy can be determined, for example, with respect to parameters of the MAP 10, such as the reliability, processing capability, traffic volume, the number of MNs 20 using the MAP 10, transmission power value, a degree of the remoteness/nearness, a delay value in packet transmission between the MAP 10 and MN 20, the number of hops between the MAP 10 and MN 20, the cost in packet transmission between the MAP 10 and MN 20, the link capacity between the MAP 10 and MN 20, and propagation path information between the MAP 10 and MN 20. Furthermore, the MAP selection policy may be determined with respect to a single parameter, or may be determined by combining a plurality of parameters.

The application unit 21 records and sets the determined MAP selection policy in the MAP selection policy storage unit 25*b*. When the application unit 21 has newly determined a MAP selection policy, then the application unit 21 updates and re-sets the MAP selection policy stored in the MAP selection policy storage unit 25*b*. The user of the MN 20 or the system designer of the mobile communication system 1 may set the MAP selection policy.

The MAP selection policy storage unit 25*b* is a selection criterion storage unit configured to store a selection criterion for selecting a MAP 10 to be used for the transfer of packets. The MAP selection policy storage unit 25*b* stores a MAP selection policy set by the application unit 21. Incidentally, the MAP selection policy storage unit 25*b* may store a MAP selection policy set by the user of the MN 20 or the system designer of the mobile communication system 1. In the present embodiment, the MAP selection policy storage unit 25*b* stores a MAP selection policy represented as "a MAP located nearest and included in MAPs provided by Carrier A and having processing capability of at least 'high'". A MAP located nearest is a MAP having a minimum delay value in packet transmission between the MAP and MN.

The TCP/UDP unit 22 is substantially the same as the TCP/UDP unit 12 in the MAP 10. Furthermore, the IP layer unit 23 is also generally the same as the IP layer unit 13 in the MAP 10. However, the IP layer unit 23 acquires from the link layer unit 28 a binding update ACK packet from the MAP 10 to the MN 20, and supplies the packet to the mobility management unit 24. Furthermore, the IP layer unit 23 acquires from the mobility management unit 24 a packet for mobility management, such as a binding update packet, buffering request packet and buffering cancellation packet from the MN 20 to the MAP 10, and inputs the packet to the link layer unit 28. The IP layer unit 23 acquires a MAP notification packet for notifying the address of the MAP 10 from the link layer unit 28, and inputs the packet to the NMDP unit 25. The IP layer unit 23 acquires a MAP query packet from the NMDP unit 25, and supplies the packet to the link layer unit 28.

The NMDP unit 25 controls the search for and detection of a MAP. Specifically, the NMDP unit 25 conducts creation of a MAP query packet and processing of the acquired MAP notification packet. For example, the NMDP unit 25 creates a MAP query packet based on the neighbor MAP table 26 and second table 25a, and inputs it to the IP layer unit 23. In other words, the NMDP unit 25 functions as a query packet creation unit configured to create a MAP query packet, which is a query packet. Furthermore, the NMDP unit 25 conducts MAP detection, decision of inter-mobile-terminal information concerning the relation between the MAP 10 and MN 20, and update of the neighbor MAP table 26 and second table 25a, based on the neighbor MAP table 26, second table 25a and acquired MAP notification packet. In other words, the NMDP unit 25 functions as a detection unit configured to detect a MAP 10, a decision unit configured to decide inter-mobile-terminal information, and an update unit configured to update the neighbor MAP table 26 and second table 25a.

In addition, the NMDP unit 25 also functions as a selection unit configured to select a MAP 10 to be used for transfer of packets. The NMDP unit 25 selects a MAP 10 to be used, from among the MAPs 10 detected by the NMDP unit 25, based on the MAP selection policy stored in the MAP selection policy storage unit 25b. In other words, the NMDP unit 25 selects an optimum MAP 10 satisfying the MAP selection policy, by comparing the MAP selection policy stored in the MAP selection policy storage unit 25b with the detected MAPs 10. The NMDP unit 25 notifies the mobility management unit 24 of an address of the selected MAP 10.

The mobility management unit 24 conducts mobility management such that the MN 20 can transmit/receive packets even if it moves. The mobility management unit 24 conducts management so as to receive packets using the MAP 10, which the NMDP unit 25 has detected and selected. The management information storage unit 24a stores information concerning mobility management such as the address of the MAP 10 selected by the NMDP unit 25, the LCoA and RCoA. Furthermore, the management information storage unit 24a stores information concerning the MN 20 required for user authentication such as a user ID assigned and a password registered when the user of the MN 20 made a contract with Carrier A for using a mobility management service.

Specifically, first, the mobility management unit 24 receives from the NMDP unit 25 a notice of an address of the MAP 10 selected by the NMDP unit 25. The mobility management unit 24 records the address of the MAP 10, which the NMDP unit 25 has notified, to the management information storage unit 24a. Next, the mobility management unit 24 obtains a LCoA and RCoA. The mobility management unit 24 obtains a LCoA by creating for itself the LCoA from a network prefix of the IP address of the AR to which the MN 20 connects via radio link, and a host identity of the IP address assigned to the MN 20. The mobility management unit 24 obtains a RCoA by creating for itself the RCoA from a network prefix of the IP address of the MAP 10 used by the MN 20 for transfer of packets, and a host identity of the IP address assigned to the MN 20. The mobility management unit 24 records the obtained LCoA and RCoA to the management information storage unit 24a.

Next, the mobility management unit 24 creates a binding update packet to be transmitted to the MAP 10, which the NMDP unit 25 has detected and selected. The mobility management unit 24 acquires a LCoA of the MN 20 and information concerning the MN 20 required for user authentication such as user ID and password, from the management information storage unit 24a. Further, the mobility management unit 24 creates a binding update packet which includes a home address and a LCoA of the MN 20, and information concerning the MN 20 required for user authentication such as user ID and password, and which is directed to the MAP 10 detected and selected by the NMDP unit 25. Or the mobility management unit 24 may acquire a RCoA and LCoA of the MN 20 from the management information storage unit 24a and create a binding update packet which includes a RCoA and LCoA of the MN 20, and information concerning the MN 20 required for user authentication such as user ID and password, and which is directed to the MAP 10 detected and selected by the NMDP unit 25. The mobility management unit 24 inputs the created binding update packet to the IP layer unit 23 and causes the interface 29 to transmit it to the MAP 10. Finally, the mobility management unit 24 can grasp the completion of notice of the address, by acquiring from the IP layer unit 23 a binding update ACK packet, which is a response to the binding update packet transmitted from the MAP 10.

Packets can be transferred from the MAP 10 to the MN 20 by transmitting such a binding update packet to the MAP 10. Thus by creating a binding update packet and causing the interface 29 to transmit it, the mobility management unit 24 manages so that MN 20 receives transfer of packets using the MAP 10, which the NMDP unit 25 has detected and selected.

Furthermore, the mobility management unit 24, at the time of handoff, creates a buffering request packet directed to the MAP 10 detected and selected by the NMDP unit 25. The mobility management unit 24 acquires information concerning the MN 20 required for user authentication such as a user ID and password from the management information storage unit 24a, and creates a buffering request packet including the acquired information. The mobility management unit 24 supplies the created buffering request packet to the IP layer unit 23 and causes the interface 29 to transmit it to the MAP 10. When the interface 29 connects to a new AR and completes the handoff, the mobility management unit 24 creates a new LCoA from a network prefix of the IP address of the newly connecting AR, and a host identity of the IP address assigned to the MN 20. Further, the mobility management unit 24 creates a buffering cancellation packet including the new LCoA indicating a visited position of the MN 20 that is a transfer destination to which the buffered packets are to be transferred, and which is directed to the MAP 10 detected and selected by the NMDP unit 25. The mobility management unit 24 supplies the created buffering cancellation packet to the IP layer unit 23 and causes the interface 29 to transmit it to the MAP 10. In this way, the mobility management unit 24 also conducts the control concerning buffering.

The second table 25a stores information required for searching for a MAP 10 and updating the neighbor MAP table 26. The neighbor MAP table 26 is a transfer device information storage unit configured to store addresses of MAPs 10. The neighbor MAP table 26 stores information concerning a plurality of neighbor MAPs.

[Mobile Communication Method]

(Search For and Detection of MAP)

Figure 4:
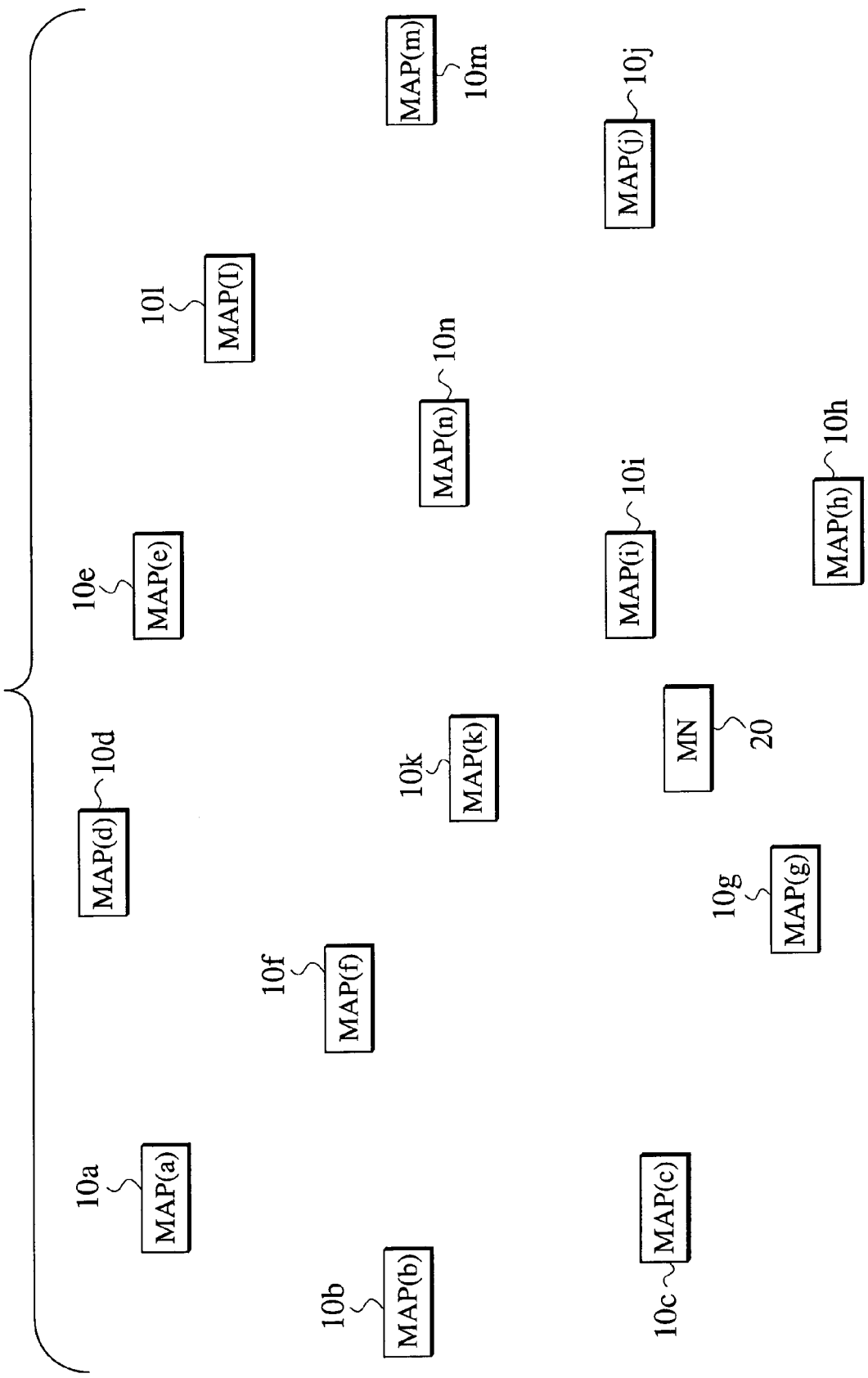
FIG. 4 is a diagram showing an arrangement of MAPs and a MN according to the first embodiment of the present invention.

The search for and detection of a MAP 10 performed by a MN 20 and other MAPs 10, and a notice of an address of a MAP 10 and of information concerning a MAP 10 performed by the MAP 10 will now be described. In the mobile communication system 1 shown in FIG. 1, if a plurality of MAPs 10 arranged in the access network (A) 40a, in the access network (B) 40b, and at the boundary between the access network (C) 40c and backbone network 50, and one MN 20 alone are picked up, the result is as shown in FIG. 4. The description will be given using a plurality of MAP(a) 10a to MAP(n) 10n shown in FIG. 4. An alphabetic letter in parentheses is a MAP symbol for discriminating a plurality of MAPs 10.

First, a detailed description will be given on the neighbor MAP tables 16, 26 and the second tables 15a, 25a, which are used in the search for and detection of a MAP 10 performed by a MN 20 and other MAPs 10, and in a notice of an address of a MAP 10 and of information concerning a MAP 10 performed by the MAP 10. By taking a neighbor MAP table 16k of the MAP(k) 10k shown in FIG. 5 as an example, the neighbor MAP table 16 of the MAP 10 will now be described.

As shown in FIG. 5, the neighbor MAP table 16k stores information concerning neighbor MAPs corresponding to the maximum number of MAP entries. In the neighbor MAP table 16, the maximum number of node entries is set to "5". By thus setting the maximum number of node entries, pressure on the storage capacity in the MAP 10 can be prevented. In the neighbor MAP table 16k, the MAP(k) 10k itself is also included as a neighbor MAP. As a result, it is not necessary to conduct exception processing for removing the MAP(k) 10k itself, which has the neighbor MAP table 16k, from the neighbor MAP table 16k, thus improving convenience. In order to prevent pressure on the storage capacity in the MAP 10, however, it is also possible to conduct setting so as not to register the MAP(k) 10k itself, which has the neighbor MAP table 16k, in the neighbor MAP table 16k.

With respect to each neighbor MAP, the neighbor MAP table 16k stores an IP address, a delay value (in msec), processing capability, a lifetime (in sec), and a sequence number 1. In FIG. 5, a MAP symbol is used as the IP address in order to simplify the description. Hereafter, the IP address of a MAP 10 is represented by using a MAP symbol. The IP address of a MN 20 is represented by "MN".

The delay value is a one-way transmission delay value between the MAP(k) 10k itself having the neighbor MAP table 16k and each neighbor MAP. In this way, the neighbor MAP table 16k stores the delay value, which is inter-transfer-device information and which can be used as remoteness/nearness decision information. The neighbor MAP table 16k stores information concerning each of neighbor MAPs according to a criterion "five neighbor MAPs having shortest delay values are stored in the order of increasing delay value". Therefore, the MAP 10 can easily conduct the work of controlling and updating the stored information.

The processing capability is the processing capability of each neighbor MAP. Furthermore, the processing capability is own-transfer-device information representing the characteristics of the MAP 10 itself. The processing capability is represented by the height of processing capability divided into four steps: highest (represented by "00"), high (represented by "01"), medium (represented by "10"), and low (represented by "11"). The height of the processing capability of the MAP 10 is determined based on the processing speed of the MAP 10, the number of MNs 20 using the MAP 10, and hardware specifications such as the storage capacity and CPU speed of the MAP 10.

The lifetime is the lifetime for information concerning each neighbor MAP in the neighbor MAP table 16k. The lifetime is decreased by the NMDP unit 15 every second. When the lifetime reaches 0, then the information concerning the neighbor MAP is erased from the neighbor MAP table 16k by the NMDP unit 15. The sequence number 1 is a sequence number of a MAP notification packet that serves as a reference for updating the delay value, processing capability, and lifetime concerning each neighbor MAP.

Next, by taking the second table 15a of the MAP(k) 10k shown in FIG. 5 as an example, the second table 15a of a MAP 10 will be described. As shown in FIG. 5, the second table 15a stores a sequence number 2, an initial lifetime (in sec), a search lifetime (in sec), processing capability, time in a timer (in sec), and a smoothing factor a.

The sequence number 2 is a sequence number of a MAP query packet last transmitted by the MAP(k) 10k. The sequence number 2 is increased by "1" by the NMDP unit 15 when creating a MAP query packet. The initial lifetime is a lifetime that is set when updating the lifetime in the neighbor MAP table 16k. The search lifetime is the time when the search for a MAP is started. Therefore, if the lifetime of the neighbor MAP table 16k reaches the search lifetime in the second table 15a, then the NMDP unit 15 starts the MAP search for a neighbor MAP.

The processing capability is the processing capability of the MAP(k) 10k itself. In the same way as in the neighbor MAP table 16k, the processing capability is indicated by the height of the processing capability divided into four steps. The timer indicates the time used by the MAP(k) 10k to measure a delay value. In order to improve the precision of delay value measurement, it is desirable that the time of the timer is updated by the NMDP unit 15 by taking a millisecond as the unit. The smoothing factor a is used to smooth a measured delay value and previous delay value when deciding a delay value. As the smoothing factor a, an arbitrary value in the range of 0 to 1 can be set. In the present embodiment, the smoothing factor a is set to "0.5".

The neighbor MAP table 26 of the MN 20 will now be described. As shown in FIG. 6, the neighbor MAP table 26 stores information concerning neighbor MAPs corresponding to the maximum number of node entries. In the neighbor MAP table 26, the maximum number of node entries is set to "5". By thus setting the maximum number of node entries, pressure on the storage capacity in the MN 20 can be prevented.

With respect to each neighbor MAP, the neighbor MAP table 26 stores an IP address, a delay value (in msec), processing capability, a lifetime (in sec), a sequence number 1, and the name of a communications carrier. The delay value is a one-way transmission delay value between each neighbor MAP and the MN 20. The name of a communications carrier is the name of the communications carrier that arranges MAPs and provides a mobility management service. The neighbor MAP table 26 stores information concerning each of neighbor MAPs according to a criterion "five neighbor MAPs having shortest delay values are stored in the order of increasing delay value". Therefore, the MN 20 can easily conduct the work of controlling and updating the stored information. The processing capability, lifetime, and the sequence number 1 are generally the same as those in the neighbor MAP table 16k of the MAP(k) 10k.

Next, the second table 25a of the MN 20 will now be described. As shown in FIG. 6, the second table 25a stores a sequence number 2, an initial lifetime (in sec), a search lifetime (in sec), time in a timer (in sec), and a smoothing factor B. These are generally the same as those in the second table 15a of the MAP(k) 10k. In the second table 25a, however, the initial lifetime is set so as to become shorter as compared with the second table 15a. It is desirable to also set the search lifetime to a shorter value accordingly. As a result, the MN 20 can search for a MAP 10 many times. Therefore, the MN 20 can update the information concerning the neighbor MAPs 10, which changes according to the movement many times, and can suitably grasp information concerning the MAPs 10 according to the movement. In addition, it is desirable to set the smoothing factor β of the second table 25a so as to be smaller than the smoothing factor a of the second table 15a. As a result, the MN 20 can suitably grasp the delay value between a neighbor MAP and the MN 20, which changes according to the movement. In the present embodiment, the smoothing factor β is set to "0".

1. Transmission and Reception of MAP Query Packet, MAP Notification Initiator Packet, and MAP Notification Packet A description will be given by taking a search for and detection of a MAP 10 performed by a MN 20 as an example. Furthermore, the description will be given by taking the case where the neighbor MAP table 26 of the MN 20 is in a state shown in FIG. 6, as an example. The lifetime for the MAP(k) 10k stored in the neighbor MAP table 26 as a neighbor MAP is currently 16 (sec), and it is decreased every second. Then one second later, the lifetime for the MAP(k) 10k in the neighbor MAP table 26 reaches 15 (sec), which is the search lifetime in the second table 25a, and the lifetime coincides with the search lifetime. Thereupon, the MN 20 starts a search for a MAP regarding the MAP(k) 10k.

Figure 7:
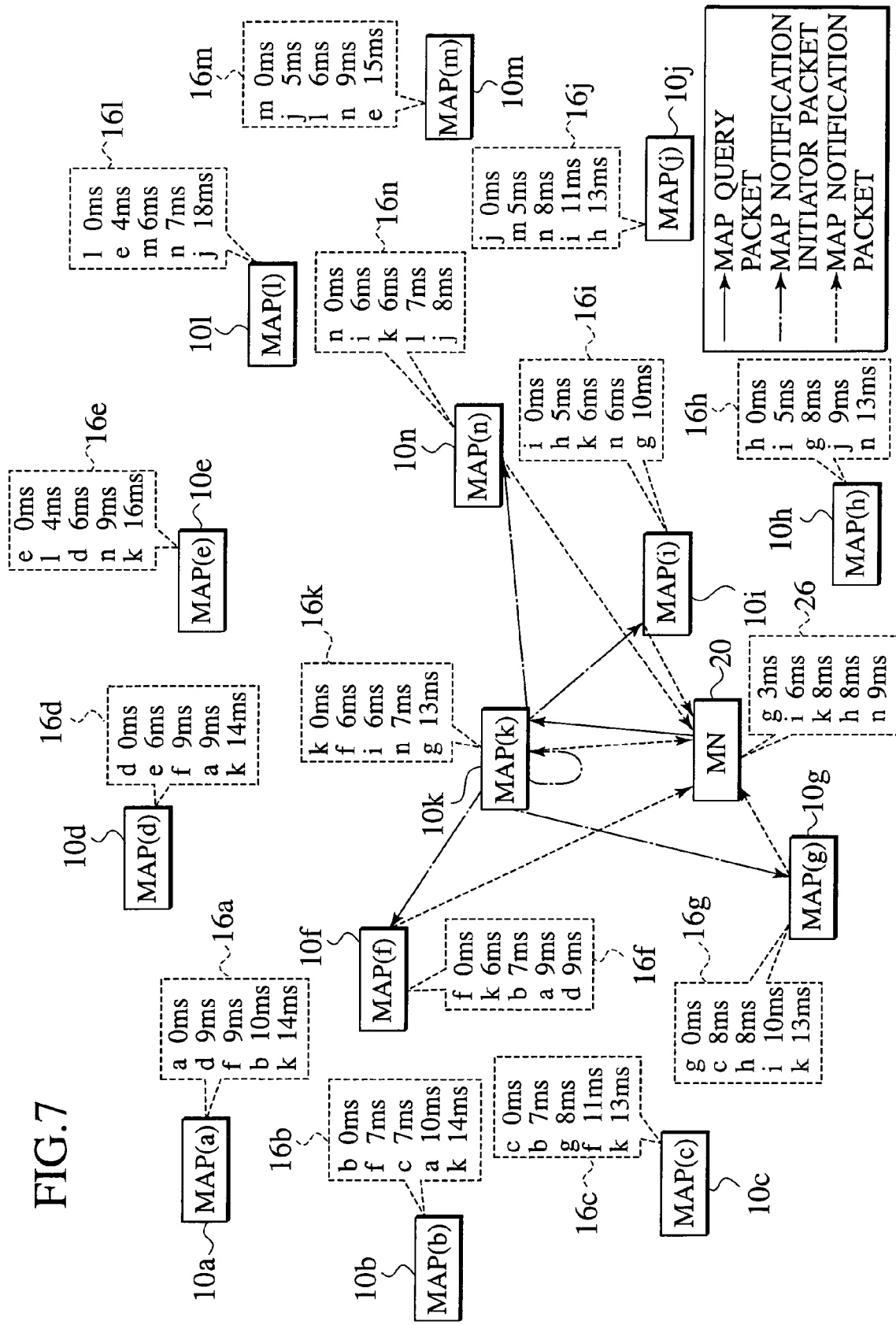
FIG. 7 is a diagram showing routes of a MAP query packet, MAP notification initiator packet and MAP notification packet according to the first embodiment of the present invention.

When the MN 20 starts to search for a MAP, as shown in FIG. 7, the MN 20 transmits a MAP query packet to the MAP(k) 10k, and the MAP(k) 10k receives it as represented by a solid line arrow in FIG. 7. In this case, therefore, the MAP(k) 10k becomes a query packet reception transfer device, which receives the transmitted query packet. In FIG. 7, neighbor MAP tables 16a to 16n and the neighbor MAP table 26, respectively, of the MAP(a) 10a to MAP(n) 10n and the MN 20 are shown together with the MAP(a) 10a to MAP (n) 10n and the MN 20. For brevity of description, however, only IP addresses of the neighbor MAPs, and delay values (decimals omitted) between each of the MAP(a) 10a to MAP (n) 10n and MN 20, and its neighbor MAPs are shown.

Figure 8:
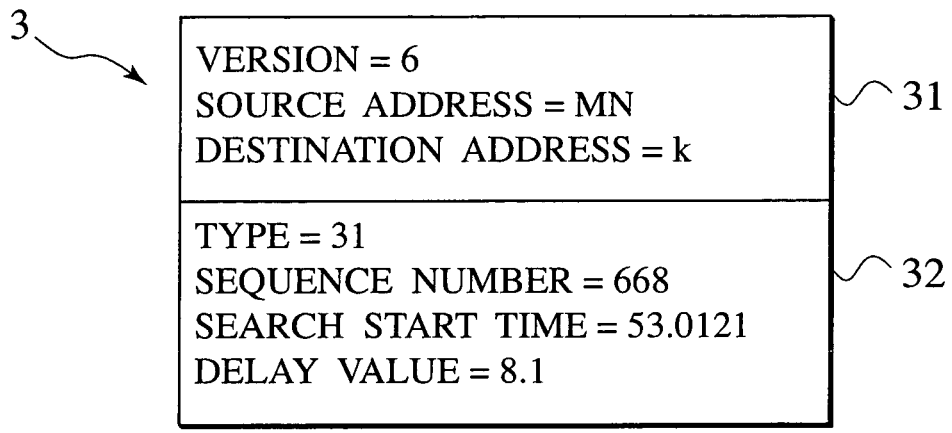
FIG. 8 is a diagram showing a MAP query packet according to the first embodiment of the present invention.

Specifically, the NMDP unit 25 in the MN 20 creates a MAP query packet 3 shown in FIG. 8, and the interface 29 transmits it. The MAP query packet 3 includes an IPv6 header 31 and a destination option header 32. A version for indicating the version of IP, a source address for indicating the transmission source of the MAP query packet 3, and a destination address for indicating the destination of the MAP query packet 3 are stored in the IPv6 header 31. Although only information relating to the present invention will now be described, various other kinds of information are also stored in the IPv6 header. The destination option header 32 is one of the extended headers in the option of the IPv6. A type for indicating the kind of the packet, a sequence number for controlling the MAP query packet 3, search start time for indicating the time at which a search for a MAP is started (the time at which the MAP query packet 3 is transmitted), and a delay value in packet transmission between the query packet reception transfer device and the MN 20 are stored in the destination option header 32.

The NMDP unit 25 sets the source address in the IPv6 header 31 to "MN" of the MN 20, and sets the destination address in the IPv6 header 31 to the IP address "k" of the MAP(k). The NMDP unit 25 sets the type in the destination option header 32 to "31" which indicates the MAP query packet 3. The NMDP unit 25 sets the sequence number in the destination option header 32 to "668", which is obtained by adding 1 to the value "667" of the sequence number 2 in the second table 25a shown in FIG. 6. At this time, the NMDP unit 25 also updates the value of the sequence number 2 in the second table 25a to "668".

In addition, the NMDP unit 25 copies the time of creation of the MAP query packet 3, "53.0121" in the timer of the second table 25a (the search for a MAP is started one second after the state "52.0121" as shown in FIG. 6), and sets the search start time in the destination option header 32 to the copied time. Furthermore, the NMDP unit 25 copies a delay value "8.1" for the MAP(k) 10k in the neighbor MAP table 26 shown in FIG. 6, as a delay value between the MN 20 and the MAP(k) 10k serving as the query packet reception transfer device, and sets the delay value in the destination option header 32 to the copied delay value. In this way, the NMDP unit 25 creates the MAP query packet 3 to be transmitted to an address of a neighbor MAP stored in the neighbor MAP table 26, and functions as the query packet creation unit.

Upon receiving the MAP query packet 3, as shown in FIG. 7, the MAP(k) 10k transmits a MAP notification initiator packet to each of the neighbor MAPs stored in the neighbor MAP table 16k in the MAP(k) 10k, i.e., the MAP(k) 10k, MAP(f) 10f, MAP(i) 10i, MAP(n) 10n and MAP(g) 10g as represented by a dot-dash line in FIG. 7. In this way, the MAP(k) 10k, which has become the query packet reception transfer device, transmits the MAP notification initiator packet to the MAP(f) 10f, MAP(i) 10i, MAP(n) 10n and MAP(g) 10g other than the MAP(k) 10k itself. Here, the MAP(f) 10f, MAP(i) 10i, MAP(n) 10n and MAP(g) 10g become peripheral transfer devices. The peripheral transfer device is a transfer device other than the query packet reception transfer device. All transfer devices other than the query packet reception transfer device included in the mobile communication system 1 correspond to peripheral transfer devices. Furthermore, the peripheral transfer device can be a MAP having an address stored in the neighbor MAP table 16k of the MAP(k) 10k.

As described above, the MAP(k) 10k transmits a MAP notification initiator packet uniformly to all neighbor MAPs stored in the neighbor MAP table 16k. As a result, operation of the MAP(k) 10k serving as the query packet reception transfer device can be simplified. In this case, however, the MAP(k) 10k also transmits the MAP notification initiator packet to the MAP(k) 10k itself. Therefore, the MAP(k) 10k may exceptionally remove the MAP(k) 10k, which is itself serving as a query packet reception transfer device, from destinations of the MAP notification initiator packet. As a result, it is possible to prevent extra packet transmission.

Figure 9A:
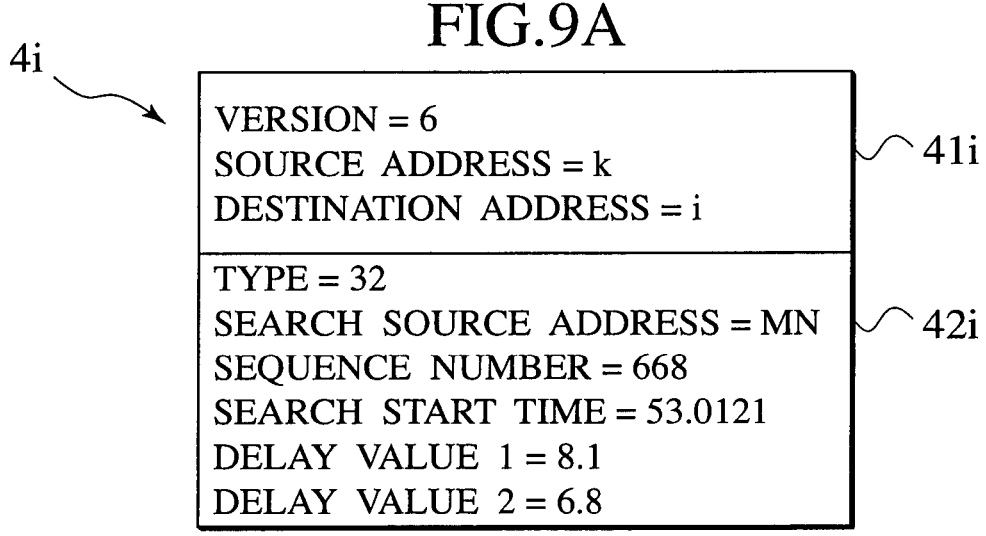
FIGS. 9A and 9B are diagrams showing MAP notification initiator packets according to the first embodiment of the present invention.
Figure 9B:
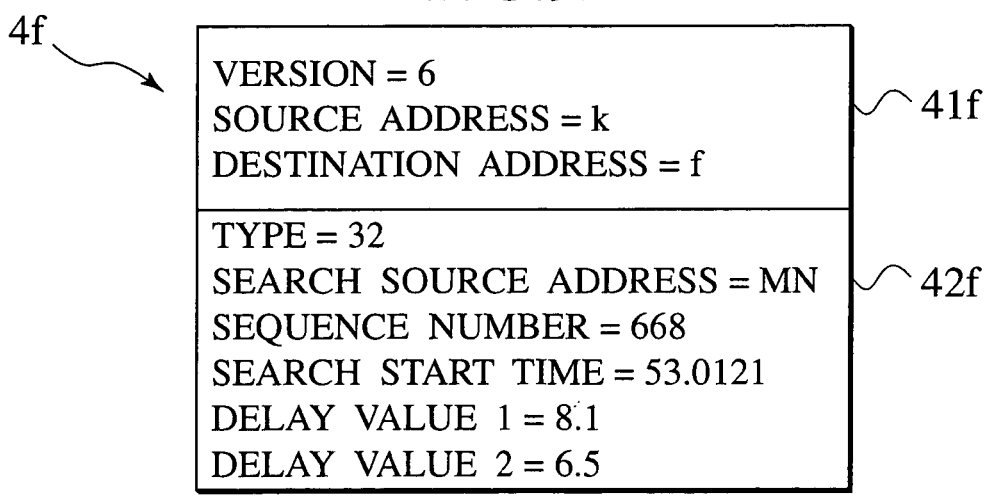

Specifically, the NMDP unit 15 in the MAP(k) 10k creates a MAP notification initiator packet, and the interface 19 transmits the MAP notification initiator packet. Hereafter, this operation will be described by taking the transmission of a MAP notification initiator packet to each of the MAP(i) 10i and MAP(f) 10f as an example. FIG. 9A shows a MAP notification initiator packet 4i to be transmitted to the MAP(i) 10i, and FIG. 9B shows a MAP notification initiator packet 4f to be transmitted to the MAP(f) 10f.

The MAP notification initiator packets 4i and 4f include IPv6 headers 41i and 41f, and destination option headers 42i and 42f, respectively. Versions for indicating the IP version, source addresses for indicating sources of the MAP notification initiator packets 4i and 4f, and destination addresses for indicating destinations of the MAP notification initiator packets 4i and 4f are stored in the IPv6 headers 41i and 41f, respectively. A type, a search source address for indicating the MN 20 or MAP 10 which has transmitted the MAP query packet, a sequence number for controlling the MAP notification initiator packet 4i or 4f, search start time, a delay value 1 in packet transmission between the MN 20 or MAP 10 which has transmitted the MAP query packet and the query packet reception transfer device, and a delay value 2 in packet transmission between the query packet reception transfer device and a peripheral transfer device are stored in each of the destination option headers 42i and 42f.

The NMDP unit 15 in the MAP(k) 10k sets the source address in the IPv6 header 41i to the IP address "k" of the MAP(k) 10k, and sets the destination address in the IPv6 header 41i to the IP address "i" of the MAP(i) 10i. Furthermore, the NMDP unit 15 in the MAP(k) 10k sets the type in the destination option header 42i to "32" which indicates a MAP notification initiator packet. Furthermore, the NMDP unit 15 in the MAP(k) 10k copies the IP address "MN" of the MN 20 serving as the source address in the received MAP query packet 3 shown in FIG. 8, and sets the search source address in the destination option header 42i to the copied IP address "MN".

The NMDP unit 15 in the MAP(k) 10k copies the value "668" of the sequence number and the value "53.0121" of the search start time in the received MAP query packet 3 shown in FIG. 8, and sets the sequence number and the search start time in the destination option header 42i to the copied values, respectively. Furthermore, the NMDP unit 15 in the MAP(k) 10k copies the delay value "8.1" in the MAP query packet 3 shown in FIG. 8, as the delay value between the MN 20 which has transmitted the MAP query packet and the MAP(k) 10k serving as the query packet reception transfer device, and sets the delay value 1 in the destination option header 42i to the copied delay value. Furthermore, the NMDP unit 15 in the MAP(k) copies the delay value "6.8" between the MAP(k) 10k and MAP(i) 10i in the neighbor MAP table 16k shown in FIG. 5, as a delay value between the MAP(k) 10k serving as the query packet reception transfer device and the MAP(i) 10i serving as a peripheral transfer device, and sets the delay value 2 in the destination option header 42i to the copied delay value. In this way, the NMDP unit 15 in the MAP(k) 10k creates the MAP notification initiator packet 4i for requesting an other MAP to transmit a MAP notification packet to the MN, and functions as the initiator packet creation unit. In addition, the NMDP unit 15 creates the MAP notification initiator packet 4i to be transmitted to the peripheral transfer device. And, the interface 19 functions as a communication unit configured to transmit the MAP notification initiator packet created by the NMDP unit 15 to other MAP.

In the same way, the NMDP unit 15 in the MAP(k) 10k creates the MAP notification initiator packet 4f to be transmitted to the MAP(f) 10f. However, the NMDP unit 15 in the MAP(k) 10k sets the destination address in the IPv6 header 41f to the IP address "f" of the MAP(f) 10f. Furthermore, the NMDP unit 15 in the MAP(k) 10k copies the delay value "6.5" between the MAP(k) 10k and MAP(f) 10f in the neighbor MAP table 16k shown in FIG. 5, and sets the delay value 2 in the destination option header 42f to the copied delay value.

Upon receiving the MAP notification initiator packet, as shown in FIG. 7, the MAP(k) 10k, MAP(f) 10f, MAP(i) 10i, MAP(n) 10n and MAP(g) 10g each transmit a MAP notification packet to the MN 20 as represented by a dot line arrow in FIG. 7. In this way, the MAP(f) 10f, MAP(i) 10i, MAP(n) 10n and MAP(g) 10g serving as the peripheral transfer devices each returns a MAP notification packet to the MN 20, which has transmitted the MAP 10 query packet. As described above, the MAP(k) 10k transmits a MAP notification initiator packet uniformly to all neighbor MAPs stored in the neighbor MAP table 16k. Therefore, the MAP(k) 10k serving as the query packet reception transfer device also receives the MAP notification initiator packet, and transmits a MAP notification packet.

Specifically, the NMDP unit 15 in each of the MAP(k) 10k, MAP(f) 10f, MAP(i) 10i, MAP(n) 10n and MAP(g) 10g creates a MAP notification packet, and the interface 19 transmits the MAP notification packet. Hereafter, this operation will be described by taking the return of a MAP notification packet from each of the MAP(i) 10i and MAP(f) 10f as an example. FIG. 10A shows a MAP notification packet 5i to be returned from the MAP(i) 10i, and FIG. 10B shows a MAP notification packet 5f to be returned from the MAP(f) 10f.

The MAP notification packets 5i and 5f include IPv6 headers 51i and 51f, and destination option headers 52i and 52f, respectively. Versions for indicating the IP version, source addresses for indicating sources of the MAP notification packets 5i and 5f, and destination addresses for indicating destinations of the MAP notification packets 5i and 5f are stored in the IPv6 headers 51i and 51f, respectively. A type, a sequence number for controlling the MAP notification packet 5i or 5f, search start time, a delay value 1 in packet transmission between the MN 20 or MAP 10 which has transmitted the MAP query packet and the query packet reception transfer device, a delay value 2 in packet transmission between the query packet reception transfer device and a peripheral transfer device, processing capability of the peripheral transfer device, and the name of a communications carrier are stored in each of the destination option headers 52i and 52f.

Thus, the MAP notification packet includes transfer device information concerning a MAP serving as the transfer device. In the transfer device information, there are own-transfer-device information concerning the transfer device itself, inter-mobile-terminal information concerning the relation between the transfer device and MN, and inter-transfer-device information concerning the relation between the transfer device and other transfer device. The own-transfer-device information includes at least one of the processing capability of the transfer device, traffic volume in the transfer device, the number of mobile terminals using the transfer device, transmission power value of the transfer device, reliability of the transfer device, and communications carrier of the transfer device.

The inter-mobile-terminal information includes at least one of the delay value between the transfer device and mobile terminal, the number of hops between the transfer device and mobile terminal, the cost in packet transmission between the transfer device and mobile terminal, the link capacity between the transfer device and mobile terminal, and the propagation path information between the transfer device and mobile terminal. The inter-transfer device information includes at least one of the delay value between the transfer device and other transfer device, the number of hops between the transfer device and other transfer device, the cost in packet transmission between the transfer device and other transfer device, the link capacity between the transfer device and other transfer device, and the propagation path information between the transfer device and other transfer device.

The NMDP unit 15 in the MAP(i) 10i sets the source address in the IPv6 header 51i to the IP address "i" of the MAP(i) 10i. The NMDP unit 15 in the MAP(i) 10i copies the IP address "MN" of the MN 20 serving as the search source address in the received MAP notification initiator packet 4i shown in FIG. 9A, and sets the destination address in the IPv6 header 51i to the copied IP address "MN". The NMDP unit 15 in the MAP(i) 10i sets the type in the destination option header 52i to "33" which indicates a MAP notification packet.

The NMDP unit 15 in the MAP(i) 10i copies the value "668" of the sequence number and the value "53.0121" of the search start time in the received MAP notification initiator packet 4i shown in FIG. 9A, and sets the sequence number and the search start time in the destination option header 52i to the copied values, respectively. The NMDP unit 15 in the MAP(i) 10i copies the delay value 1 "8.1" in the MAP notification initiator packet 4i shown in FIG. 9A, as a delay value between the MN 20 which has transmitted the MAP query packet and the MAP(k) 10k serving as the query packet reception transfer device, and sets the delay value 1 in the destination option header 52i to the copied delay value. The NMDP unit 15 in the MAP(i) 10i copies the delay value 2 "6.8" in the MAP notification initiator packet 4i shown in FIG. 9A, as a delay value between the MAP(k) 10k serving as the query packet reception transfer device and the MAP(i) 10i serving as a peripheral transfer device, and sets the delay value 2 in the destination option header 52i to the copied delay value.

Furthermore, the NMDP unit 15 in the MAP(i) 10i copies the processing capability in the second table 15a of the MAP (i) 10i, as the processing capability of the MAP(i) 10i itself serving as a peripheral transfer device, and sets the processing capability in the destination option header 52i to the copied processing capability. Here, it is supposed that the processing capability of the MAP(i) 10i is "01" (high). The NMDP unit 15 memorizes the name of the communications carrier that arranges MAP and provides a mobility management service. The NMDP unit 15 in the MAP(i) 10i memorizes "Carrier A" as the name of the communications carrier. Therefore, The NMDP unit 15 in the MAP(i) 10i sets the name of the communications carrier in the destination option header 52i to the memorized "Carrier A". In this way, the NMDP unit 15 in the MAP(i) 10i creates the MAP notification packet 5i, and functions as the notification packet creation unit.

In the same way, the NMDP unit 15 in the MAP(f) 10f creates the MAP notification packet 5f to be returned from the MAP(f) 10f. However, the NMDP unit 15 in the MAP(f) 10f sets the destination address in the IPv6 header 51f to the IP address "f" of the MAP(f) 10f. The NMDP unit 15 in the MAP(f) 10f copies the delay value 2 "6.5" in the MAP notification initiator packet 4f shown in FIG. 9B, and sets the delay value 2 in the destination option header 52f to the copied delay value. The NMDP unit 15 in the MAP(f) 10f copies the processing capability in the second table of the MAP(f) 10f, and sets the processing capability in the destination option header 52f to the copied processing capability. Here, it is supposed that the processing capability of the MAP(f) 10f is "11" (low). And, the NMDP unit 15 in the MAP(f) 10f memorizes "Carrier A" as the name of the communications carrier. Therefore, The NMDP unit 15 in the MAP(f) 10f sets the name of the communications carrier in the destination option header 52i to the memorized "Carrier A".

2. Inter-mobile-terminal Information Decision, MAP Detection, and Neighbor MAP Table Update Upon receiving the MAP notification packet, the MN 20 conducts decision of inter-mobile-terminal information, detection of the MAP 10, and update of the neighbor MAP table 26 based on the returned MAP notification packet. Hereafter, this operation will be described by taking MAP notification packets 5i and 5f returned from the MAP(i) 101 and MAP(f) 10f as an example. FIG. 11 shows the state of the neighbor MAP table 26 and second table 25a when the MN 20 has received the MAP notification packet 5i returned from the MAP(i) 10i. FIG. 12 shows the state of the neighbor MAP table 26 and second table 25a when the MN 20 has received the MAP notification packet 5f returned from the MAP(f) 10f. In the neighbor MAP table 26 and second table 25a shown in FIGS. 11 and 12, some items have already been updated, as compared with the state immediately preceding the start of the search for a MAP shown in FIG. 6.

First, the case where MN20 has received the MAP notification packet 5i returned from the MAP(i) 10i will now be described. Upon receiving the MAP notification packet 5i, the MN 20 first measures a delay value between the MN 20 and the MAP(i) 10i serving as a peripheral transfer device. Specifically, the NMDP unit 25 in the MN 20 refers to the time of the timer in the second table 25a (FIG. 11) when the MAP notification packet 5i has been received, and thereby acquires the arrival time "53.0330" of the MAP notification packet 5i. Subsequently, the NMDP unit 25 acquires the search start time "53.0121", the delay value 1 "8.1" between the MN 20 and the MAP(k) 10k serving as the query packet reception transfer device, and the delay value 2 "6.8" between the MAP(k) 10k serving as the query packet reception transfer device and the MAP(i) 10i serving as a peripheral transfer device, from the received MAP notification packet 5i (FIG. 10A).

Further, the NMDP unit 25 conducts a calculation of subtracting the search start time, delay value 1 and delay value 2 from the arrival time, and thereby obtains the delay value between the MN 20 and MAP(i) 10i. The calculation result becomes 53.0330−(53.0121+0.0081+0.0068)=0.0060. In this way, the delay value between the MN 20 and MAP(i) 10i newly measured in the MN 20 becomes 0.0060 (sec), i.e., 6.0 (msec).

Subsequently, the NMDP unit 25 retrieves to determine whether the source address "i" in the MAP notification packet 5i (FIG. 10A) is included in the IP addresses in the neighbor MAP table 26 (FIG. 11). If the source address "i" in the newly received MAP notification packet 5i exists in the neighbor MAP table 26, then the NMDP unit 25 determines that the MAP(i) 10i serving as the transmission source of the MAP notification packet 5i is an already detected MAP. In this case, therefore, the NMDP unit 25 determines that the MAP notification packet 5i should be used to update the information concerning the MAP(i) 10i already stored as a neighbor MAP. In the case of FIG. 11, the source address "i" is included in the IP addresses in the neighbor MAP table 26. Therefore, the NMDP unit 25 determines that the MAP notification packet 5i should be used to update the information concerning the MAP(i) 10i.

Subsequently, the NMDP unit 25 determines whether update of existing information concerning the MAP(i) 10i in the neighbor MAP table 26 based on the received MAP notification packet 5i should be executed. Specifically, the NMDP unit 25 compares the sequence number "668" in the received MAP notification packet 5i with the sequence number 1 "667" for the MAP(i) 10i in the neighbor MAP table 26 (FIG. 11) when the MAP notification packet 5i is received. If the sequence number in the MAP notification packet 5i is higher, then the NMDP unit 25 determines that the information based on the MAP notification packet 5i is the latest information and update of the information should be executed. In the case of FIG. 11, the sequence number in the MAP notification packet 5i is higher. Therefore, the NMDP unit 25 determines that update of the information should be executed.

On the other hand, in some cases, a MAP notification packet in response to a MAP query packet transmitted before the MAP query packet corresponding to the MAP notification packet used when the MN 20 updates the neighbor MAP table 26 the last time, may arrive at the MN 20 later for some reason. If the sequence number in the MAP notification packet 5i is lower than the sequence number 1 for the MAP(i) 10i in the neighbor MAP table 26, therefore, then there is a possibility that information included in the MAP notification packet 5i is not the latest information or suitable information. In this case, therefore, the NMDP unit 25 determines that update of the information should not be executed.

Subsequently, the NMDP unit 25 executes update of information concerning the MAP(i) 10i in the neighbor MAP table 26. First, the NMDP unit 25 conducts smoothing on measured delay values. Specifically, the NMDP unit 25 accesses the neighbor MAP table 26 and second table 25a shown in FIG. 11 when the MN 20 receives the MAP notification packet 5i, and thereby acquires an existing delay value "6.3" and a smoothing factor β "0" for the MAP(i) 10i. Further, the NMDP unit 25 substitutes the above-mentioned measured delay values, existing delay value and smoothing factor β in the following expression (1), and thereby smoothes the delay value. The result of substitution is given by expression (2).

$$\text{Existing delay value} \times \beta + \text{measured delay value} \times (1-\beta) \tag{1}$$

$$6.3 \times 0 + 6.0 \times (1-0) = 6.0 \tag{2}$$

The smoothed delay value in this way becomes 6.0 (msec). The NMDP unit 25 thus functions as the decision unit configured to decide inter-mobile-terminal information between peripheral transfer device and the MN 20, by measuring and smoothing the delay value between the MAP(i) 10i serving as the peripheral transfer device and the MN 20, based on the inter-mobile-terminal information between the MAP(k) 10k serving as the query packet reception transfer device and the MN 20, and the inter-transfer-device information between the MAP(k) 10k serving as the query packet reception transfer device and the MAP(i) 10i serving as the peripheral transfer device, which are included in the MAP notification packet, and thereby determining a delay value. Incidentally, smoothing of the delay value need not necessarily be conducted.

Subsequently, the NMDP unit 25 acquires the processing capability "01" (high) and the sequence number "668" from the MAP notification packet 5i (FIG. 10A). The NMDP unit 25 acquires the initial lifetime "30" from the second table 25a (FIG. 11). The NMDP unit 25 updates so as to have the latest information concerning the MAP(i) 10i in the neighbor MAP table 26 (FIG. 11), by replacing the existing delay value "6.3" with the determined delay value "6.0", replacing the existing processing capability "01" (high) with the acquired processing capability "01" (high), replacing the existing lifetime "21" with the acquired initial lifetime "30", replacing the existing sequence number 1 "667" with the acquired sequence number "668", and replacing the existing name of the communications carrier "Carrier A" with the acquired name of the communications carrier "Carrier A".

As a result of such an updating operation, the information concerning the MAP(i) 10i in the neighbor MAP table 26 becomes the latest information concerning the MAP(i) 10i in the neighbor MAP table 26 shown in FIG. 12. In this way, the NMDP unit 25 updates the neighbor MAP table 26, and functions as the update unit.

The case where the MN 20 has received the MAP notification packet 5f returned from the MAP(f) 10f will now be described. Upon receiving the MAP notification packet 5f, the MN 20 first measures a delay value between the MN 20 and the MAP(f) 10f serving as a peripheral transfer device. Specifically, the NMDP unit 25 refers to the time of the timer in the second table 25a (FIG. 12) at the time when the MAP notification packet 5f has been received, and thereby acquires the arrival time "53.0419" of the MAP notification packet 5f. Subsequently, the NMDP unit 25 acquires the search start time "53.0121", the delay value 1 "8.1" between the MN 20 and the MAP(k) 10k serving as the query packet reception transfer device, and the delay value 2 "6.5" between the MAP(k) 10k serving as the query packet reception transfer device and the MAP(f) 10f serving as the peripheral transfer device, from the received MAP notification packet 5f (FIG. 10B).

Further, the NMDP unit 25 calculates in the same way as the MAP notification packet 5i, and thereby obtains the delay value between the MN 20 and MAP(f) 10f. The calculation result becomes 53.0419−(53.0121+0.0081+0.0065)=0.0152. In this way, the delay value between the MAP(f) 10f and MN 20 newly measured in the MN 20 becomes 0.0152 (sec), i.e., 15.2 (msec).

Subsequently, the NMDP unit 25 retrieves to determine whether the source address "f" in the MAP notification packet 5f (FIG. 10B) is included in the IP addresses in the neighbor MAP table 26 (FIG. 12). If the source address "f" in the newly received MAP notification packet 5f does not exist in the neighbor MAP table 26, then the NMDP unit 25 determines that the MAP(f) 10f serving as the transmission source of the MAP notification packet 5f is a newly detected MAP. In other words, the NMDP unit 25 determines that there is a possibility that the MAP(f) 10f is newly registered in the neighbor MAP table 26 as a neighbor MAP for the MN 20. In the case of FIG. 12, the source address "f" is not included in the IP addresses in the neighbor MAP table 26. Therefore, the NMDP unit 25 determines that the MAP(f) 10f is a newly detected MAP.

Subsequently, the NMDP unit 25 determines whether the detected MAP(f) 10f should be newly recorded in the neighbor MAP table 26 as a neighbor MAP for the MN 20. First, the NMDP unit 25 compares to determine whether the delay value of the MAP(f) 10f measured based on the MAP notification packet 5f is shorter than the greatest delay value of the neighbor MAPs stored in the neighbor MAP table 26 (FIG. 12) when the MAP notification packet 5f has been received.

If the delay value of the MAP(f) 10f is greater than or equal to the greatest delay value in the neighbor MAP table 26 (FIG. 12), then the NMDP unit 25 determines that the MAP(f) 10f should not be newly recorded in the neighbor MAP table 26 as a neighbor MAP for the MN 20. In the case of FIG. 12, the measured delay value "15.2" of the MAP(f) 10f is greater than or equal to the greatest delay values in the neighbor MAP table 26. Therefore, the NMDP unit 25 determines that the MAP(f) 10f should not be newly recorded in the neighbor MAP table 26. In this case, the NMDP unit 25 does not update the neighbor MAP table 26 based on the MAP notification packet 5f.

On the other hand, if the delay value of the MAP(f) 10f is shorter than the greatest delay values in the neighbor MAP table 26 when the MAP notification packet 5f has been received, then the NMDP unit 25 erases information concerning a neighbor MAP having the greatest delay value in the neighbor MAP table 26. Further, the NMDP unit 25 updates the neighbor MAP table 26 based on the MAP notification packet 5f. As a result, the NMDP unit 25 records the MAP(f) 10f in the neighbor MAP table 26 as a new neighbor MAP of the MN 20.

Specifically, since the MAP(f) 10f is a newly registered MAP, the NMDP unit 25 decides to store the measured delay value as it is in the neighbor MAP table 26. The NMDP unit 25 acquires the source address, processing capability, sequence number, and the name of the communications carrier from the MAP notification packet 5f, and acquires the initial lifetime from the second table 25a. The NMDP unit 25 stores information concerning the acquired MAP(f) 10f in such a location in the neighbor MAP table 26 as to satisfy the criterion that information concerning neighbor MAPs is stored in the order of increasing delay value.

In this way, the MN 20 can register the newly detected MAP(f) 10f in the neighbor MAP table 26 as a neighbor MAP for the MN 20. A fixed number of neighbor MAPs can be stored in the neighbor MAP table 26 in the order of increasing delay time. In this way, the NMDP unit 25 detects a new MAP based on the MAP notification packet 5f, and functions as the detection unit. The NMDP unit 25 updates the neighbor MAP table 26 based on the decided delay value and a newly detected MAP, and functions as the update unit.

3. Neighbor MAP Erasing

In response to a MAP query packet transmitted by the MN 20, a MAP notification packet is returned from the MAP(k) 10k serving as the query packet reception transfer device as shown in FIG. 7. If the MAP(k) 10k malfunctions or is removed due to a failure, then the MAP notification packet is not returned from the MAP(k) 10k in response to the MAP query packet transmitted by the MN 20.

Here, as described above, a search for a MAP is started when the lifetime of the information concerning a neighbor MAP has become short as with the lifetime for the MAP(k) 10k in the neighbor MAP table 26 shown in FIG. 6. The lifetime is decreased every second. If a MAP notification packet is not returned from the MAP(k) 10k, then the information concerning the MAP(k) 10k in the neighbor MAP table 26 is not updated, and the lifetime is not updated, either. As a result, the lifetime of the information concerning the MAP(k) 10k in the neighbor MAP table 26 reaches 0. In this case, the NMDP unit 25 in the MN 20 erases the information concerning the MAP(k) 10k from the neighbor MAP table 26.

Additionally, as described above, in the case where the sequence number in the MAP notification packet returned from the MAP(k) 10k is lower than the sequence number 1 for the MAP(k) 10k in the neighbor MAP table 26, update of the information based on the MAP notification packet is not conducted, and the lifetime is not updated, either. In this case too, therefore, the lifetime of the information concerning the MAP(k) 10k in the neighbor MAP table 26 reaches 0 in the same way, and the NMDP unit 25 erases the information concerning the MAP(k) 10k from the neighbor MAP table 26.

While the search for and detection of a MAP 10 effected by the MN 20 have been described above as an example, the MAP 10 can also conduct the search for and detection of other MAPs 10 in the same way as the search for and detection of a MAP 10 performed by the MN 20. In other words, the NMDP unit 15 in the MAP 10 functions as the query packet creation unit configured to create a MAP query packet. The NMDP unit 15 functions as the detection unit configured to detect other MAPs based on the MAP notification packet. The NMDP unit 15 functions as the decision unit configured to decide a delay value (inter-transfer-device information) based on the MAP notification packet. Furthermore, the NMDP unit 15 functions as the update unit configured to update the neighbor MAP table 16. Further, the MAP 10 also conducts transmission and reception of a MAP query packet, MAP notification initiator packet, and MAP notification packet, decision of inter-transfer-device information, detection of other MAPs 10, update of the neighbor MAP table 16, and erasing of a neighbor MAP.

4. Movement of MN 20

As to how the MN 20 searches for and detects a MAP 10 while moving on a movement route indicated by an arrow D in FIG. 13 will now be described. First, the MN 20 is in a position indicated by an arrow A in FIG. 13. The position indicated by the arrow A in FIG. 13 is in the access network (A) 40a and near the access network (B) 40b, in the mobile communication system 1 shown in FIG. 1.

When the lifetime of the information concerning any of MAPs in the neighbor MAP table 26 in the MN 20 reaches the search lifetime, then the MN 20 starts a search for a MAP. The MN 20 transmits a MAP query packet to the MAP. Subsequently, the MN 20 receives a MAP notification packet returned from a MAP that has become a peripheral transfer device, in response to the MAP query packet. The NMDP unit 25 detects a new MAP, and updates the neighbor MAP table 26, based on the received MAP notification packet.

Figure 13:
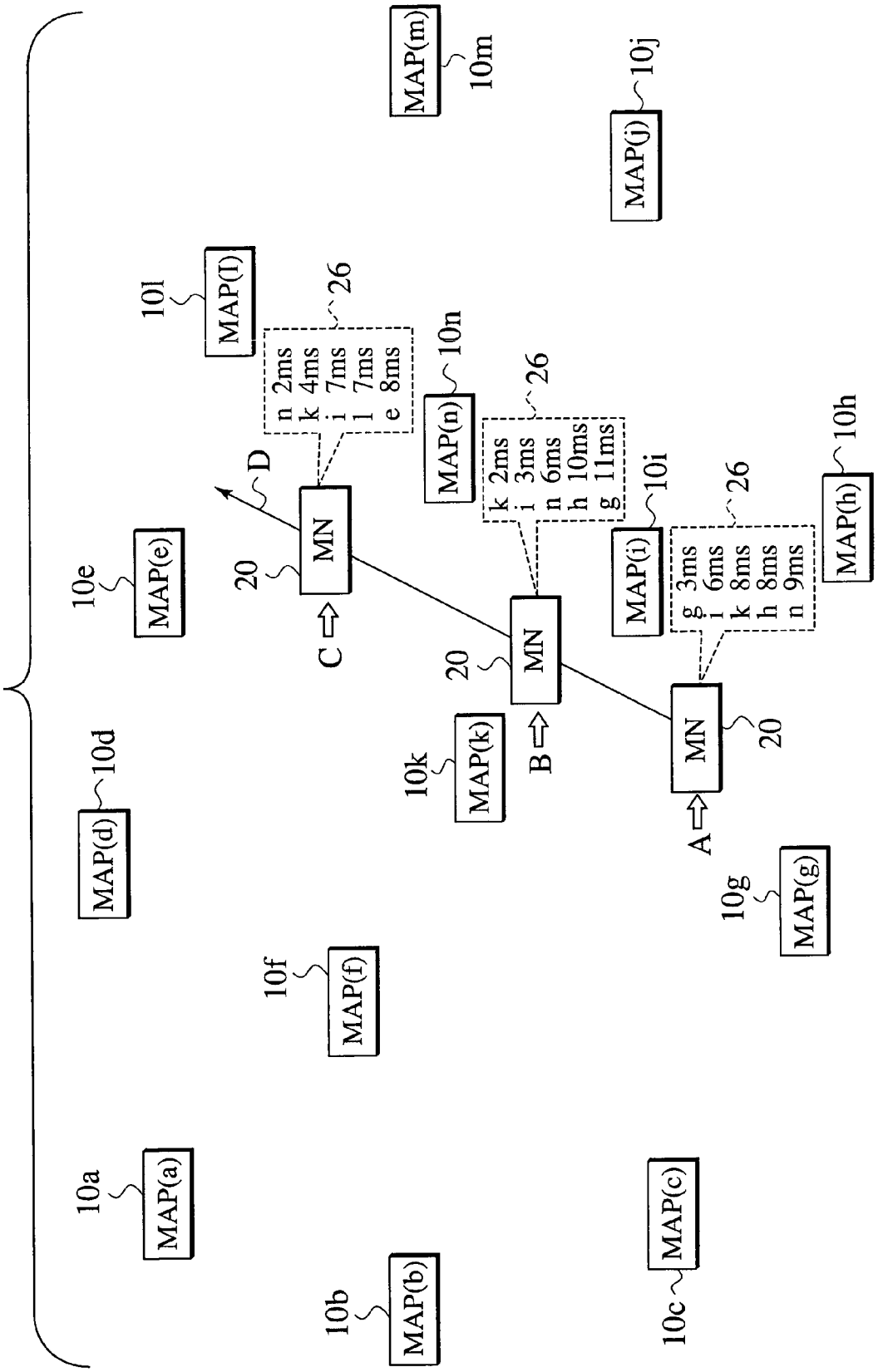
FIG. 13 is a diagram showing the state of movement of a MN according to the first embodiment of the present invention.

As a result, information concerning neighbor MAPs having short delay values between the MAPs and the MN 20 located in the position indicated by the arrow A in FIG. 13, is recorded in the neighbor MAP table 26 in the order of increasing delay time as MAP(g) 10g, MAP(i) 10i, MAP(k) 10k, MAP(h) 10h and MAP(n) 10n. In this case, the position indicated by the arrow A in FIG. 13 where the MN 20 exists is in the access network (A) 40a and near the access network (B) 40b in the mobile communication system 1 shown in FIG. 1. Therefore, the MN 20 can detect both a MAP 10 arranged in the access network (A) 40a and a MAP 10 arranged in the access network (B) 40b, and record them in the neighbor MAP table 26.

As shown in FIG. 6, the initial lifetime and search lifetime stored in the second table 25a of the MN 20 are set to short time values. While the MN 20 moves on the movement route indicated by the arrow D from the position indicated by the arrow A to a position indicated by an arrow C via a position indicated by an arrow B in FIG. 13, the lifetime values for information concerning neighbor MAPs in the neighbor MAP table 26 reaches the search lifetime one after another, and the MN 20 searches for a MAP repetitively.

In the position indicated by the arrow B in FIG. 13, therefore, information concerning neighbor MAPs having short delay values between the MAPs and the MN 20 located in the position indicated by the arrow B in FIG. 13, is recorded in the neighbor MAP table 26 in the order of increasing delay time as MAP(k) 10k, MAP(i) 10i, MAP(n) 10n, MAP(h) 10h and MAP(g) 10g. Incidentally, the position indicated by the arrow B in FIG. 13 is in the access network (B) 40b and near the access network (A) 40a, in the mobile communication system 1 shown in FIG. 1. Therefore, the MN 20 can detect both a MAP 10 arranged in the access network (B) 40b and a MAP 10 arranged in the access network (A) 40a, and record them in the neighbor MAP table 26.

Furthermore, in the position indicated by the arrow C in FIG. 13, information concerning neighbor MAPs having short delay values between the MAPs and the MN 20 located in the position indicated by the arrow C in FIG. 13, is recorded in the neighbor MAP table 26 in the order of increasing delay time as MAP(n) 10n, MAP(k) 10k, MAP(i) 10i, MAP(l) 10l and MAP(e) 10e. Incidentally, the position indicated by the arrow C in FIG. 13 is in the access network (C) 40c and near the access network (B) 40b, in the mobile communication system 1 shown in FIG. 1. Therefore, the MN 20 can detect both a MAP arranged at the boundary between the backbone network 50 and access network (C) 40c, and a MAP arranged in the access network (B) 40b, and record them in the neighbor MAP table 26.

Incidentally, it is desirable to previously set an address and delay value of at least one MAP 10 included in the mobile communication system 1 in the neighbor MAP table 26 of the MN 20, as initialization. As a result, the MN 20 can transmit a MAP query packet to at least one MAP 10, and start a search for a MAP. As for the address of the MAP 10 to be set, it may be an address of an arbitrary MAP 10. It is desirable, however, in consideration of the area in which the user of the MN 20 uses the mobile communication system 1, to set the address of a MAP 10 that is arranged in the area in which the user uses it.

(Selection of MAP)

Selection of a MAP 10 will now be described by taking the case where the MN 20 has the neighbor MAP table 26 shown in FIG. 6, as an example. The NMDP unit 25 in the MN 20 first acquires the MAP selection policy represented as "a MAP located nearest (a MAP having a minimum delay value in packet transmission between the MAP and MN), and included in MAPs provided by Carrier A and having processing capability of at least 'high'" from the MAP selection policy storage unit 25*b*.

Subsequently, the NMDP unit 25 compares the information concerning neighbor MAPs stored in the neighbor MAP table 26 shown in FIG. 6 with the MAP selection policy acquired from the MAP selection policy storage unit 25*b*, and selects an optimum MAP 10 satisfying the MAP selection policy. As a result, the NMDP unit 25 selects the MAP(g) 10*g* as the MAP to be used for transfer of packets. In this way, the NMDP unit 25 functions as the selection unit. The NMDP unit 25 notifies the mobility management unit 24 of the address of the MAP(g) 10*g*. The mobility management unit 24 creates a binding update packet or buffering request packet to be transmitted to the MAP(g) 10*g* notified by the NMDP unit 25. Finally, the interface 29 transmits the binding update packet or buffering request packet to the MAP(g) 10*g*.

According to the mobile communication system 1, MN 20, MAP 10, and mobile communication method, the following effects can be obtained. The NMDP unit 25 in the MN 20 detects a MAP 10. Further, the interface 29 connects to the AR(A) 30*a* to AR(C) 30*c* and transmits/receives packets to/from the MAP 10 detected by the NMDP unit 25. Therefore, the MN 20 can detect and grasp a MAP 10 by itself. Further, the MN 20 can transmit/receive packets to/from the detected MAP 10 via the connecting AR(A) 30*a* to AR(C) 30*c*.

Furthermore, the MN 20 has a MAP selection policy storage unit 25*b*. The NMDP unit 25 selects a MAP to be used for transfer of packets from among the detected MAP 10 based on the MAP selection policy stored in the MAP selection policy storage unit 25*l*. Therefore, the MN 20 can select an optimum MAP 10 satisfying the MAP selection policy from among the detected MAP 10 and causes the MAP 10 to transfer packets.

In the present embodiment, the delay value is used as one of the parameters for the MAP selection policy. The delay value is determined under the influence of various parameters, such as the link capacity and number of hops between the MN 20 and MAP 10, and the processing capability and traffic volume of the MAP 10 itself. Therefore, the MN 20 can select the optimum MAP by using the delay value as one of the parameters of the MAP selection policy. In the present embodiment, the MN 20 uses the processing capability, which is information other than the remoteness/nearness decision information, as one of the parameters of the MAP selection policy. Therefore, the MN 20 can select the optimum MAP 10 by considering not only the remoteness/nearness condition but also the state of the MAP 10 itself.

In addition, in the present embodiment, "MAP provided by Carrier A" is used as the first condition of the MAP selection policy. In this manner, using communications carrier as the MAP selection policy, in step of selecting the MAP 10, narrows the range of MAPs that the MN20 can select. As a result, the MN 20 can prevent transmitting the binding update packet to the MAP 10, with which the MN 20 has no contract for using a mobility management service.

Furthermore, the NMDP unit 25 creates a MAP query packet to be transmitted to an address stored in the neighbor MAP table 26. The interface 29 transmits the MAP query packet and receives a MAP notification packet in response to the MAP query packet. Further, NMDP unit 25 detects a MAP 10 based on the MAP notification packet. Therefore, the MN 20 can search for and detect a MAP by itself. In addition, the MN 20 detects a MAP 10 based on the notification packet returned from the MAP serving as the query packet reception transfer device or peripheral transfer device. Therefore, the MN 20 can easily detect a MAP 10 located in the mobile communication system 1. Furthermore, the MN 20 can receive a MAP notification packet, which meets the situation at the time of transmission of the MAP query packet. Therefore, the MN 20 can detect a MAP, which exists in the mobile communication system 1 at the time of transmission of the MAP query packet.

The MAP notification packet includes transfer device information concerning a MAP 10. Therefore, the MN 20 can detect a MAP 10 based on the MAP notification packet, as well as grasp the transfer device information concerning the MAP 10. Furthermore, the MN 20 can grasp the transfer device information, which meets the situation at the time of transmission of the MAP query packet, by receiving the MAP notification packet, which meets the situation at the time of transmission of the MAP query packet.

As the transfer device information, the MAP notification packet includes inter-mobile-terminal information concerning the relation between the MAP 10 serving as the query packet reception transfer device and the MN 20, and inter-transfer-device information concerning the relation between the MAP 10 serving as the query packet reception transfer device and the MAP 10 serving as the peripheral transfer device. The NMDP unit 25 decides the inter-mobile-terminal information concerning the relation between the MAP 10 serving as the peripheral transfer device and the MN 20, based on the inter-mobile-terminal information concerning the relation between the query packet reception transfer device and the MN 20, and the inter-transfer-device information concerning the relation between the query packet reception transfer device and peripheral transfer device, included in the notification packet. Therefore, the MN 20 can easily grasp the inter-mobile-terminal information between the peripheral transfer device and the MN 20 based on the inter-mobile-terminal information between the query packet reception transfer device and the MN 20, and the inter-transfer-device information between the query packet reception transfer device and peripheral transfer device. In addition, it becomes unnecessary to attain synchronization between the MN 20 and a plurality of MAPs 10.

The NMDP unit 15 in the MAP 10 creates a MAP notification packet for notifying the address and transfer device information of the MAP 10, based on the address of the MAP 10 stored in the neighbor MAP table 16. Further, the interface 19 transmits the MAP notification packet to the MN20. Therefore, the MAP 10 itself can make the existence of the MAP 10 known to the MN 20. Consequently, the MAP 10 can receive notice of a terminal care of address from the MN 20, which the MAP 10 has notified of its own existence, and transfer packets to a visited position of the MN 20.

The NMDP unit 15 creates a MAP notification initiator packet, and the interface 19 transmits it to other MAPs 10. Therefore, the MAP 10 can provide the MN 20 with more information concerning the MAP 10, by making it possible for the MN 20 to receive MAP notification packets returned from more MAPs 10 by requesting other MAPs 10 to return MAP notification packets.

The NMDP unit 15 creates a MAP notification initiator packet to be transmitted to peripheral transfer devices other than the query packet reception transfer device. Therefore, the MAP 10 serving as the peripheral transfer device transmits a notification packet to the mobile terminal. Therefore, the MAP 10 can also provide information concerning the MAP 10 serving as the peripheral transfer device.

Furthermore, the determination unit 17 in the MAP 10 determines whether a binding update packet or buffering request packet received from the MN 20 is a packet from a MN 20 allowed to use packet transfer performed by the MAP 10. Further, the mobility management unit 14 manages the transfer of packets to the visited position of the MN 20 based on the determination result. Therefore, the MAP 10 can conduct packet transfer to the visited position only for such a MN 20 allowed to use packet transfer performed by the MAP 10 as a MN 20 used by the subscriber of the mobility management service. Accordingly, the mobility management service can be provided only to the subscribers of the mobility management service, by using the MAP 10 as described above.

The MAP 10 has a subscriber database 17*a* which stores terminal information unique to each MN 20 allowed to use the packet transfer. The determination unit 17 determines based on the whether the information included in the packet received by the interface 19 coincides with the terminal information stored in the subscriber database 171. Therefore, the MAP 10 can easily determine whether the received packet is a packet from a MN 20 allowed to use packet transfer performed by the MAP 10.

By using the mobile communication system 1, MN 20 and MAP 10 as described above, a connection management service conducted by using AR(A) 30*a* to AR(C) 30*c* and a mobility management service conducted by using a MAP 10 can be separately provided to the MN 20. As a result, the user of the MN 20 will obtain greater flexibility to select a service, because the user can use the connection management service and mobility management service separately. Furthermore, a communications carrier that provides services to MNs 20 can also provide a mobility management service to users who do not use the connection management service it provides, and can also provide a connection management service to users who do not use the mobility management service it provides. Therefore, the communications carrier that provides services to MNs 20 will obtain a greater possibility of sufficiently acquiring users of each service.

Second Embodiment

In the present embodiment, a decision criterion that a smaller number of hops between nodes indicates a shorter distance, is used as the decision criterion for determining whether the distance between nodes is short. As the remoteness/nearness decision information, the number of hops between nodes is used. The MAP and MN according to the present embodiment are generally the same as the MAP 10 and MN 20 shown in FIGS. 2 and 3, respectively, except that the operation concerning the search for a MAP, the decision of inter-mobile-terminal information and inter-transfer-device information, the detection of a MAP, and the update of a neighbor MAP table conducted by the NMDP unit 15 and NMDP unit 25, and the neighbor MAP tables and second tables of the MAP and MN are different. Furthermore, the MAP selection policy storage unit 25*b* stores a MAP selection policy, "a MAP located nearest". A MAP located nearest is a MAP having a minimum number of hops between the MAP and MN. The configuration of the mobile communication system according to the present embodiment is substantially the same as that of the mobile communication system 1 shown in FIG. 1, except for the MAP and MN.

Figure 14:
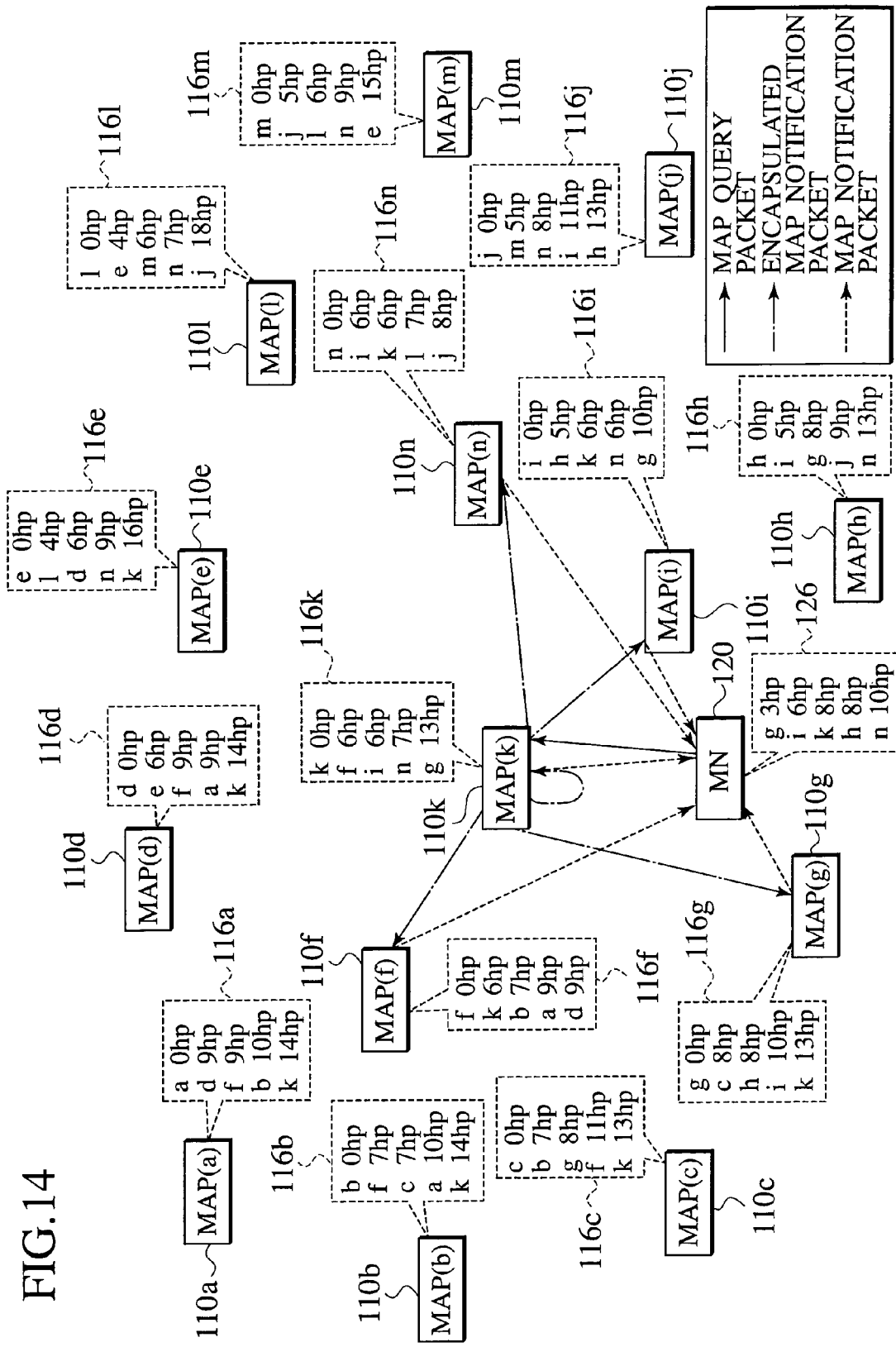
FIG. 14 is a diagram showing routes of a MAP query packet and MAP notification packet according to a second embodiment of the present invention.

A plurality of MAP(a) 110*a* to MAP(n) 110*n* and one MN 120 alone in the mobile communication system are shown in FIG. 14. Furthermore, neighbor MAP tables 116*a* to 116*n* and the neighbor MAP table 126, respectively, of the MAP(a) 110*a* to MAP(n) 110*n* and the MN 120 are shown together with each MAP(a) 110*a* to MAP(n) 110*n* and the MN 120. For brevity of description, however, only IP addresses of the neighbor MAPs, and the number of hops between each of the MAP(a) 110*a* to MAP(n) 110*n* and MN 120, and its neighbor MAPs are shown.

Figure 15:
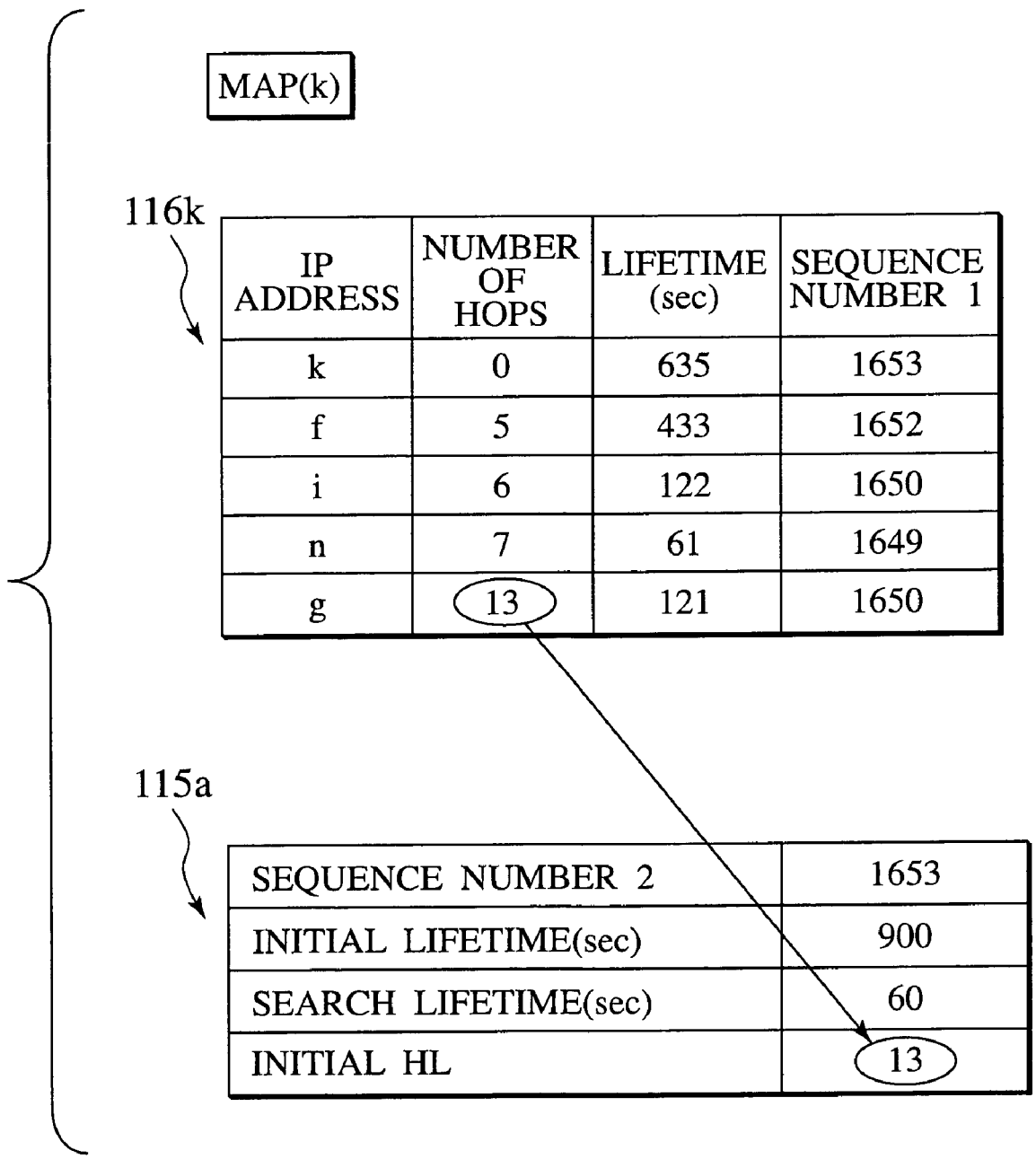
FIG. 15 is a diagram showing a neighbor MAP table and a second table in a MAP(k) according to the second embodiment of the present invention.

FIG. 15 shows the neighbor MAP table 116*k* and second table 115*a* of the MAP(k) 110*k* shown in FIG. 14. The neighbor MAP table and second table of the MAP according to the present embodiment will now be described by taking a neighbor MAP table 116*k* and second table 115*a* shown in FIG. 15, as an example. The neighbor MAP table 116*k* stores an IP address, the number of hops, lifetime (in sec), and a sequence number 1 for each neighbor MAP. The maximum number of node entries in the neighbor MAP table 116*k* is set to 5.

The number of hops is the number of hops between the MAP(k) 110*k* itself having the neighbor MAP table 116*k* and each neighbor MAP. The neighbor MAP table 116*k* stores information concerning the neighbor MAPs according to the criterion, "five neighbor MAPs having smallest number of hops are stored in the order of increasing number of hops." The lifetime and sequence number 1 are similar to those in the neighbor MAP table 16*k* shown in FIG. 5.

The second table 115*a* stores a sequence number 2, initial lifetime (in sec), search lifetime (in sec), and initial HL (Hop Limit). The sequence number 2, initial lifetime, and search lifetime are similar to those in the second table 15*a* shown in FIG. 5. The value of the initial HL is the number of hops that becomes a reference value for determining the number of hops between the MAP(k) 1101 itself and other MAPs. The initial HL is set to the initial value of HL in the MAP notification packet. The initial HL of the MAP is set to the maximum value in the number of hops for the neighbor MAPs stored in the neighbor MAP table 116*k*. Therefore, the second table 115*a* stores the number of hops "13" between the MAP (k) 110*k* and MAP(g) 110*g* as the initial HL. The initial HL may not be set to the maximum value in the number of hops for the neighbor MAPs stored in the neighbor MAP table 116*k*, but the initial HL may be previously set to a constant value in the second table 115*a*. Or, the initial HL may be set to a value obtained by adding a preset constant value to the maximum value in the number of hops for the neighbor MAPs stored in the neighbor MAP table 116*k*.

Figure 16:
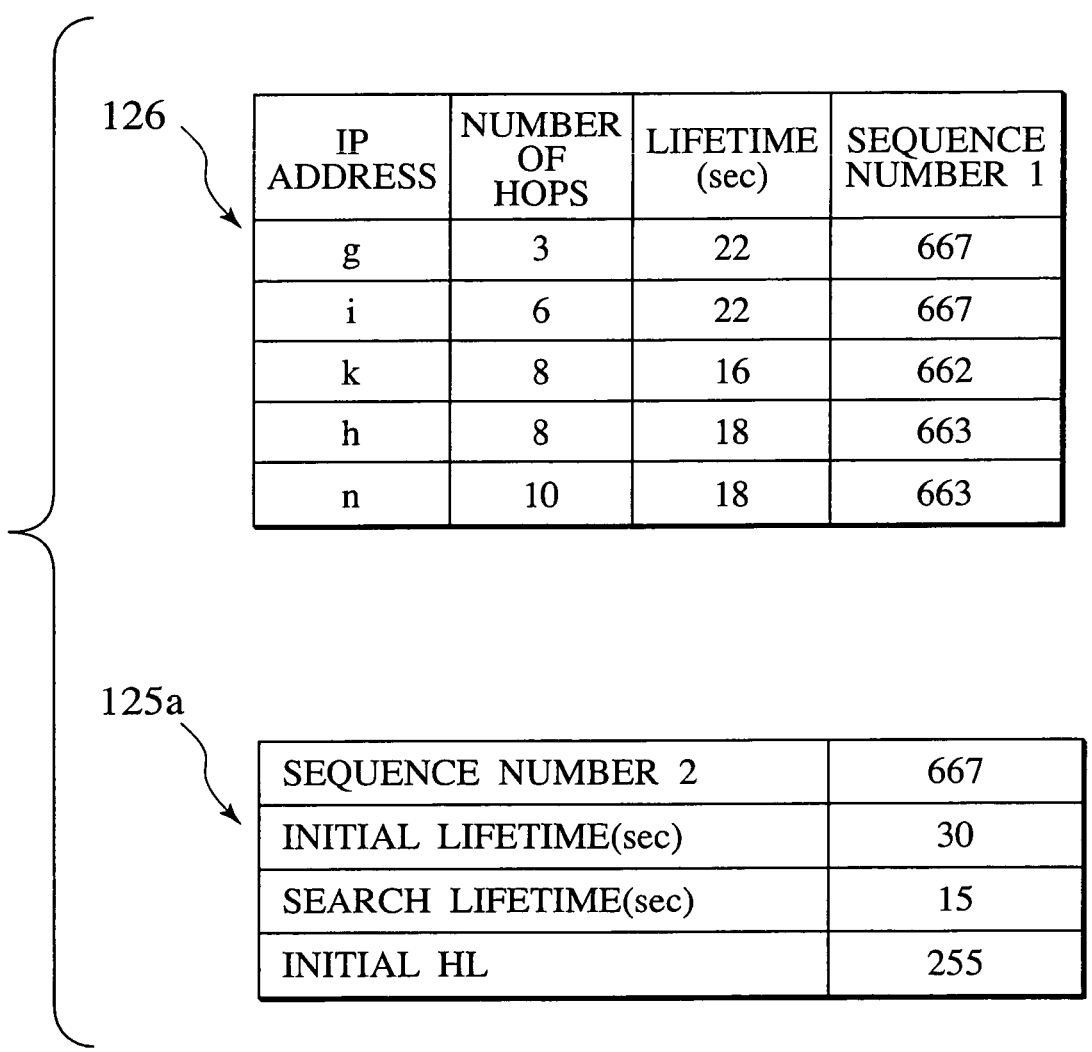
FIG. 16 is a diagram showing a neighbor MAP table and a second table in a MN according to the second embodiment of the present invention.

FIG. 16 shows the neighbor MAP table 126 and second table 125*a* of the MN 120 shown in FIG. 14. The neighbor MAP table 126 stores an IP address, the number of hops, lifetime (in sec), and a sequence number 1 for each neighbor MAP. The maximum number of node entries in the neighbor MAP table 126 is set to "5". The number of hops is the number of hops between the MN 120 and each neighbor MAP. The neighbor MAP table 126 stores information concerning the neighbor MAPs according to the criterion, "five neighbor MAPs having smallest number of hops are stored in the order of increasing number of hops." The lifetime and sequence number 1 are similar to those in the neighbor MAP table 26 shown in FIG. 6.

The second table 125*a* stores a sequence number 2, initial lifetime (in sec), search lifetime (in sec), and initial HL. The sequence number 2, initial lifetime, and search lifetime are similar to those in the second table 25*a* shown in FIG. 6. The value of the initial HL is the number of hops that becomes a reference value for determining the number of hops between the MN 120 and MAP. The initial HL is set to the initial value of HL in the MAP notification packet. The initial HL of the MN 20 is set to a sufficiently larger constant value than the initial HL of the MAP. In the case where the number of hops between the MN 20 and a neighbor MAP has varied largely according to the movement, therefore, the situation that MAP notification packets do not arrive at the MN 120 at all can be prevented.

(Search For and Detection of MAP)

1. Transmission and Reception of MAP Query Packet and MAP Notification Packet

A description will be given by taking the search for and detection of a MAP performed by a MN 120 as an example. The description will be given by taking the case where the neighbor MAP table 126 of the MN 120 is in a state shown in FIG. 16, as an example. The lifetime for the MAP(k) 110*k* registered in the neighbor MAP table 126 as a neighbor MAP is currently 16 (sec), and it is decreased every second. Then one second later, the lifetime for the MAP(k) 110*k* in the neighbor MAP table 126 reaches 15 (sec), which is the search lifetime. Thereupon, the MN 120 starts a search for a MAP with respect to the MAP(k) 110*k*.

Figure 17:
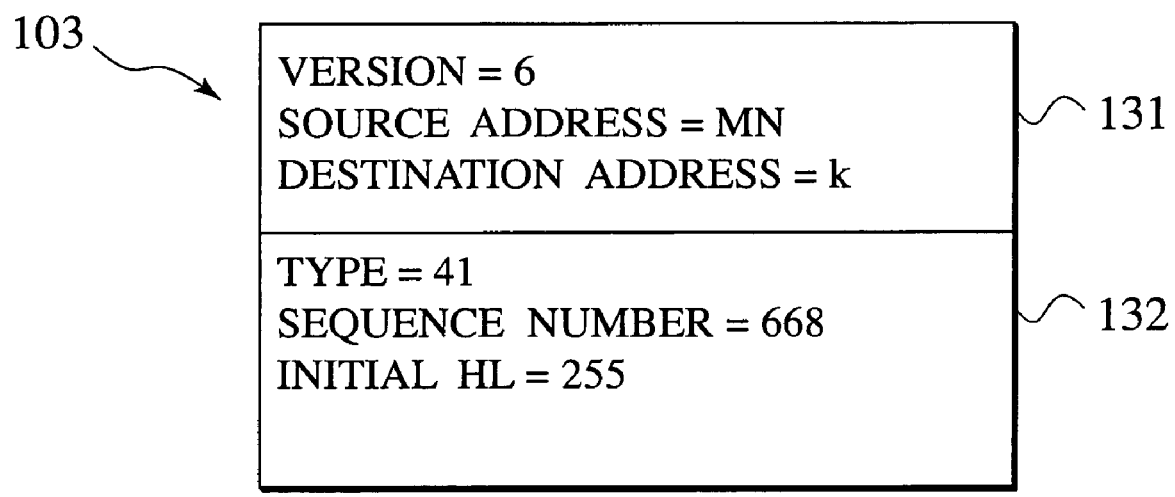
FIG. 17 is a diagram showing a MAP query packet according to the second embodiment of the present invention.

When the MN 120 starts to search for a MAP, as shown in FIG. 14, the MN 120 first transmits a MAP query packet to the MAP(k) 110*k*, and the MAP(k) 110*k* receives it as represented by a solid line arrow in FIG. 14. In this case, therefore, the MAP(k) 110*k* becomes a query packet reception transfer device. Specifically, the NMDP unit 25 in the MN 120 creates a MAP query packet 103 shown in FIG. 17, and the interface 29 transmits it.

The MAP query packet 103 includes an IPv6 header 131 and a destination option header 132. A version for indicating the version of IP, a source address for indicating the transmission source of the MAP query packet 103, and a destination address for indicating the destination of the MAP query packet 103 are stored in the IPv6 header 131. A type, a sequence number for controlling the MAP query packet 103, and an initial HL are stored in the destination option header 132.

The NMDP unit 25 in the MN 120 sets the source address in the IPv6 header 131 to the IP address "MN" of the MN 120, and sets the destination address in the IPv6 header 131 to the IP address "k" of the MAP(k) 110*k*. The NMDP unit 25 in the MN 120 sets the type in the destination option header 132 to "41" which indicates the MAP query packet 103. The NMDP unit 25 in the MN 120 sets the sequence number in the destination option header 132 to "668", which is obtained by adding 1 to the value "667" of the sequence number 2 in the second table 125*a* shown in FIG. 16. At this time, the NMDP unit 25 in the MN 120 also updates the value of the sequence number 2 in the second table 125*a* to "668". The NMDP unit 25 in the MN 120 copies the initial HL "255" in the second table 125*a*, and sets the initial HL in the destination option header 132 to the copied initial HL.

Upon receiving the MAP query packet 103, as shown in FIG. 14, the MAP(k) 110*k* transmits an encapsulated MAP notification packet to each of the neighbor MAPs stored in the neighbor MAP table 116*k* in the MAP(k) 110*k*, i.e., the MAP (k) 110*k*, MAP(f) 110*f*, MAP(i) 110*i*, MAP(n) 110*n* and MAP(g) 110*g* as represented by a dot-dash line in FIG. 14. The encapsulated MAP notification packet means a packet obtained by encapsulating a MAP notification packet returned from the MAP(k) 110*k* serving as a query packet reception transfer device to the MN 120 which has transmitted the MAP query packet. In other words, the MAP(k) 110*k* serving as the query packet reception transfer device encapsulates the MAP notification packet with a header directed to the MAP(f) 110*f*, MAP(i) 110*i*, MAP(n) 110*n* and MAP(g) 110*g* neighboring the MAP(k) 110*k* itself, and transmits a resultant encapsulated MAP notification packet. In this case, therefore, the MAP(f) 110*f*, MAP(i) 110*i*, MAP(n) 110*n* and MAP(g) 110*g* become peripheral transfer devices. The peripheral transfer device can be a transfer device having an address stored in the neighbor MAP table 116*k* of the MAP(k) 110*k*.

Figure 18A:
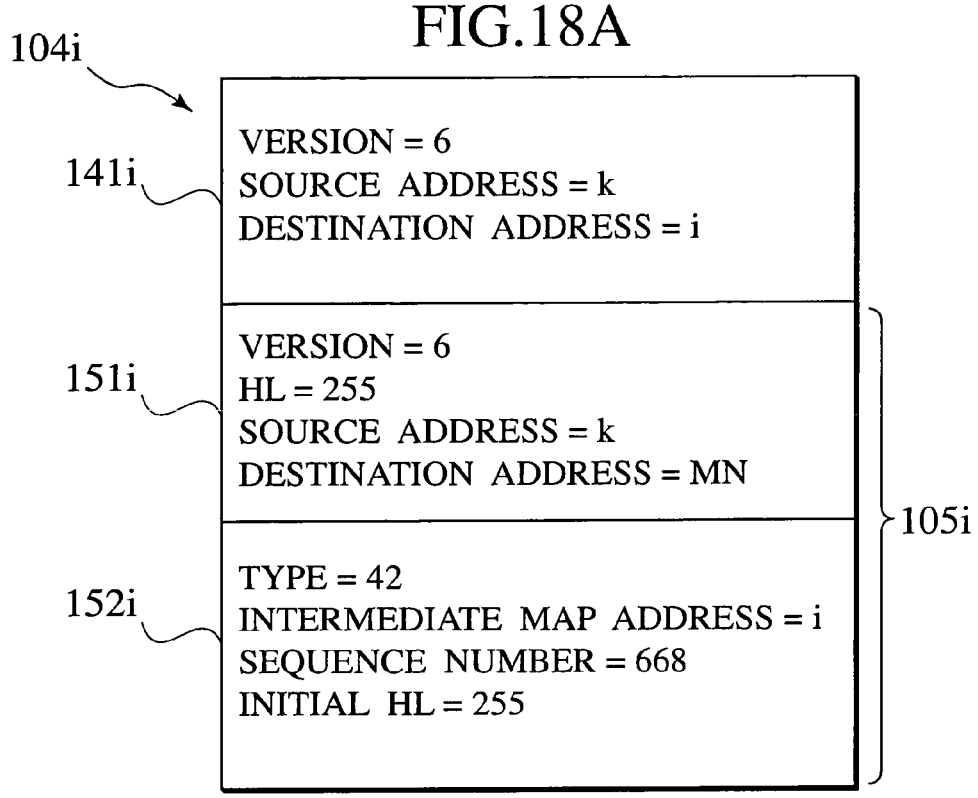
FIGS. 18A and 18B are diagrams showing encapsulated MAP notification packets according to the second embodiment of the present invention.
Figure 18B:
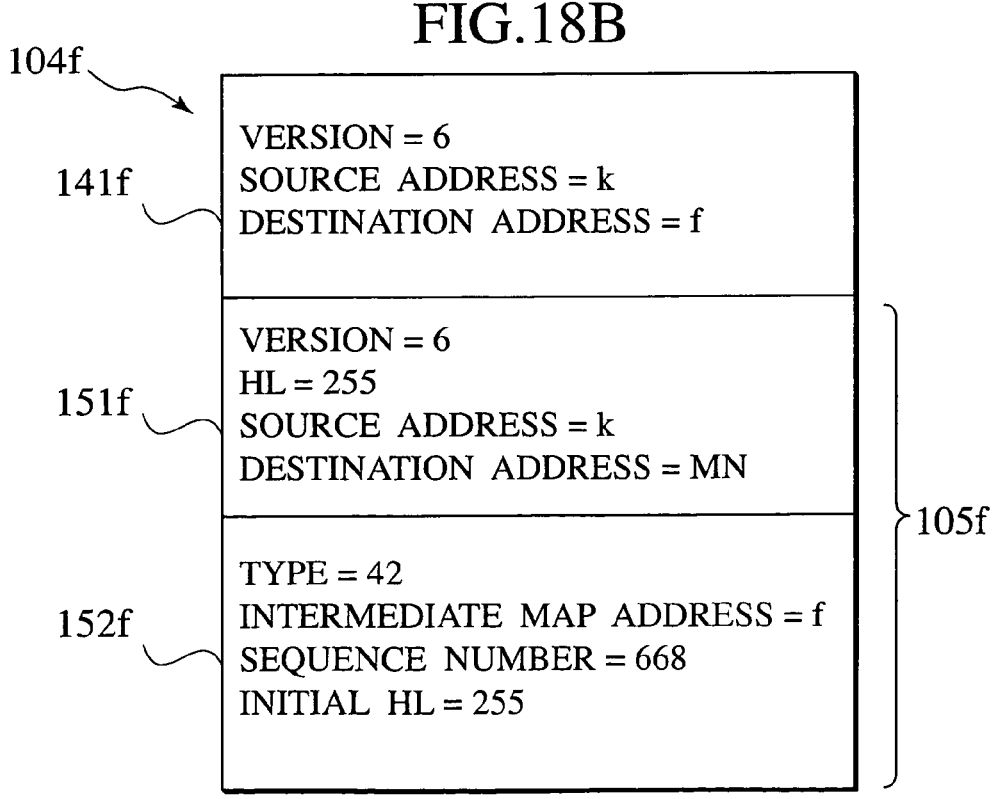

Specifically, the NMDP unit 15 in the MAP(k) 110*k* creates an encapsulated MAP notification packet, and the interface 19 transmits the encapsulated MAP notification packet. Hereafter, this operation will be described by taking the transmission of an encapsulated MAP notification packet to each of the MAP(i) 110*i* and MAP(f) 110*f*, as an example. FIG. 18A shows an encapsulated MAP notification packet 104*i* to be transmitted to the MAP(i) 110*i*, and FIG. 18B shows a MAP notification packet 104*f* to be transmitted to the MAP(f) 10*f*.

The encapsulated MAP notification packets 104*i* and 104*f* includes IPv6 headers 141*i* and 141*f*, and MAP notification packets 105*i* and 105*f*, respectively. The IPv6 headers 141*i* and 141*f* are headers, respectively, for encapsulating the MAP notification packets 105*i* and 105*f* to be returned from the MAP(k) 110*k* serving as the query packet reception transfer device to the MN 120 which has transmitted the MAP query packet. Versions for indicating the IP version, source addresses for indicating sources of the encapsulated MAP notification packets 104*i* and 104*f*, and destination addresses for indicating destinations of the encapsulated MAP notification packets 104*i* and 104*f* are stored in the IPv6 headers 141*i* and 141*f*, respectively.

The MAP notification packets 105*i* and 105*f* includes IPv6 headers 151*i* and 151*f* and destination option headers 152*i* and 152*f*, respectively. A version for indicating the IP version, an HL, a source address for indicating the source of the MAP notification packet 105*i*, 105*f*, and a destination address for indicating a destination of the MAP notification packet 105*i*, 105*f* are stored in each of the IPv6 headers 151*i* and 151*f*. A type, an intermediate MAP address, a sequence number for controlling the MAP notification packet 105*i* or 105*f*, and an initial HL are stored in each of the destination option headers 152*i* and 152*f*. The intermediate MAP address is an address of a peripheral transfer device which the MAP notification packet 105*i* or 105*f* is passed through.

The NMDP unit 15 in the MAP(k) 110*k* sets the source address in the IPv6 header 141*i* to the IP address "k" of the MAP(k) 110*k*, and sets the destination address in the IPv6 header 141*i* to the IP address "i" of the MAP(i) 110*i*. The NMDP unit 15 in the MAP(k) 110*k* copies the initial HL "255" in the received MAP query packet 103 shown in FIG. 17, and sets the HL in the IPv6 header 151*i* to the copied initial HL "255". The NMDP unit 15 in the MAP(k) 110*k* sets the source address in the IPv6 header 151*i* to the IP address "k" of the MAP(k) 110*k*, and sets the destination address in the IPv6 header 151*i* to the IP address "MN" of the MN 120.

The NMDP unit 15 in the MAP(k) 110*k* sets the type in the destination option header 152*i* to "42" which indicates a MAP notification packet. The NMDP unit 15 in the MAP(k) 110*k* copies the destination address "i" in the IPv6 header 141*I*, which is the transmission destination of the packet obtained by encapsulating the MAP notification packet 105*i*, and sets the intermediate MAP address in the destination option header 152*i* to the copied destination address "i". The NMDP unit 15 in the MAP(k) 110*k* copies the value "668" of the sequence number and the value "255" of the initial HL in the received MAP query packet 103 shown in FIG. 17, and sets the sequence number and the initial HL in the destination option header 152*i* to the copied values, respectively.

In the same way, the NMDP unit 15 in the MAP(k) 110*k* creates the encapsulated MAP notification packet 104*f* to be transmitted to the MAP(f) 110*f*. However, the NMDP unit 15 in the MAP(k) 110*k* sets the destination address in the IPv6 header 141*f* to the IP address "f" of the MAP(f) 110*f*. The NMDP unit 15 in the MAP(k) 110*k* copies the destination address "f" in the IPv6 header 141*f*, which is the transmission destination of the packet obtained by encapsulating the MAP notification packet 105*f*, and sets the intermediate MAP address in the destination option header 152*f* to the copied destination address "f".

Upon receiving the encapsulated MAP notification packet 104*i*, 104*f*, the MAP(i) 110*i* and MAP(f) 110*f* conduct decapsulation to remove the outermost IPv6 header 141*i*, 141*f*, and take out a MAP notification packet 105*i*, 105*f* to be returned from the MAP(k) 110*k* serving as the query packet reception transfer device to the MN 120 which has transmitted the MAP query packet. The MAP(i) 110*i* and MAP(f) 110*f* transmit the MAP notification packet 105*i*, 105*f* taken out to the MN 120. The MAP(k) 110*k*, MAP(n) 110*n* and MAP(g) 110*g* conduct similar processing as represented by a dot line arrow in FIG. 14. Thus, the MAP(k) 110*k* serving as the query packet reception transfer device returns the MAP notification packet to the MN 120 which has transmitted the MAP query packet, via the MAP(f) 110*f*, MAP(i) 110*i*, MAP(n) 110*n* and MAP(g) 110*g* serving as peripheral transfer devices. Specifically, the IP layer unit 13 in each of the MAP(k) 110*k*, MAP(f) 110*f*, MAP(i) 110*i*, MAP(n) 110*n* and MAP(g) 110*g* simply decapsulates the encapsulated MAP notification packet, and the interface 19 transmits the MAP notification packet taken out.

Thus, the MAP(k) 110*k* serving as the query packet reception transfer device encapsulates the MAP notification packet with the IPv6 header having an address of a neighbor MAP serving as a peripheral transfer device stored in the neighbor MAP table 116*k* as its destination, and conducts tunnel transfer of the encapsulated MAP notification packet. As a result, the MAP(k) 110*k* serving as the query packet reception transfer device can return the MAP notification packet to the MN 120 which has transmitted the MAP query packet, via MAP(f) 110*f*, MAP(i) 110*i*, MAP(n) 110*n* and MAP(g) 110*g* serving as peripheral transfer devices. Apart from such tunnel transfer, the MAP serving as the query packet reception transfer device can return the MAP notification packet to the MN 120 which has transmitted the MAP query packet, via MAPs serving as peripheral transfer devices, by using a route control header, which is an extension header of an option of IPv6.

2. Inter-Mobile-Terminal Information Decision, MAP Detection, and Neighbor MAP Table Update Upon receiving the MAP notification packet, the MN 120 conducts inter-mobile-terminal information decision, MAP detection, and neighbor MAP table update based on the returned MAP notification packet. Hereafter, this operation will be described by taking MAP notification packets 105*i* and 105*f* returned from the MAP(i) 110*i* and MAP(f) 110*f*, respectively, as an example.

First, the case where the MAP(i) 110*i* has transmitted the MAP notification packet 105*i* will now be described. The MN 120 receives the MAP notification packet 105*i* shown in FIG. 19A. The MN 120 decides the number of hops between the MAP(i) 110*i* serving as a peripheral transfer device, which the MAP notification packet 105*i* is passed through (a MAP having an address stored in the intermediate MAP address in the MAP notification packet 105*i*) and the MN 120. Specifically, the NMDP unit 25 in the MN 120 acquires a value "249" of the HL included in the IPv6 header 151*i* and a value "255" of the initial HL included in the destination option header 152*i*, from the received MAP notification packet 105*i*.

Here, as shown in FIG. 18A, the value of HL in the MAP notification packet 105*i* included in the encapsulated MAP notification packet 104*i* received by the MAP(i) 110*i*, is "255". On the other hand, the value of HL in the MAP notification packet 105*i* received by the MN 120 is "249" as encircled in FIG. 19A, because the value of HL in the MAP notification packet 105*i* is decreased by "1" every transfer while the MAP notification packet 105*i* is transmitted from the MAP(i) 110*i* to the MN 120.

The NMDP unit 25 in the MN 120 conducts a calculation for subtracting the value "249" of HL from the value "255" of the acquired initial HL, and thereby obtains the number of hops between the MAP(i) 110*i* and the MN 120. The result of the calculation becomes 255−249=6. In this way, the number of hops between the MAP(i) 110*i* and MN 120, which is decided in the MN 120, becomes "6".

Figure 19A:
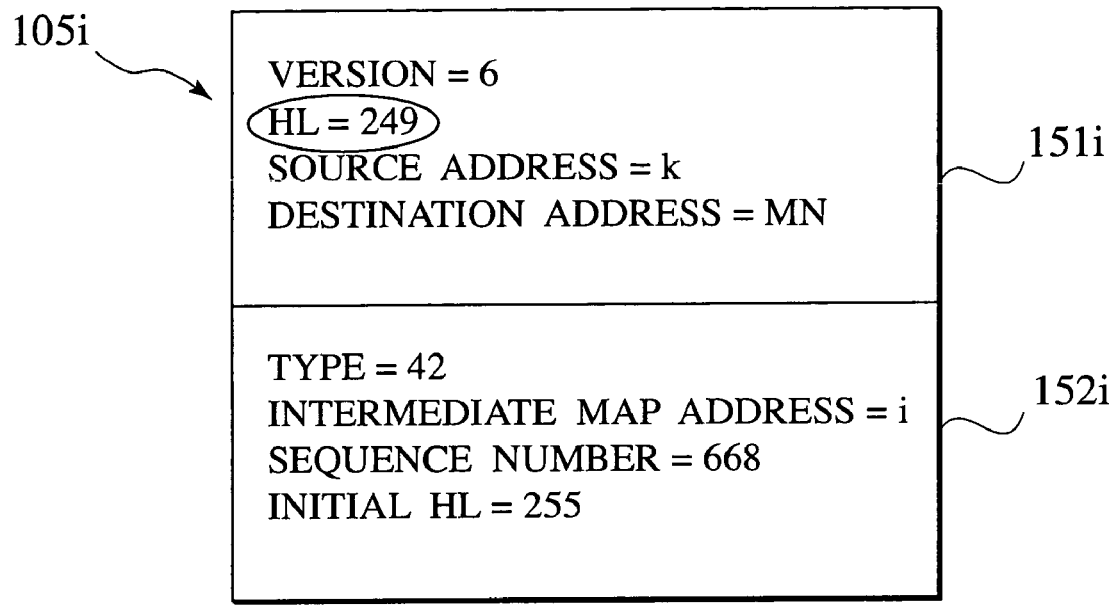
FIGS. 19A and 19B are diagrams showing MAP notification packets according to the second embodiment of the present invention.
Figure 19B:
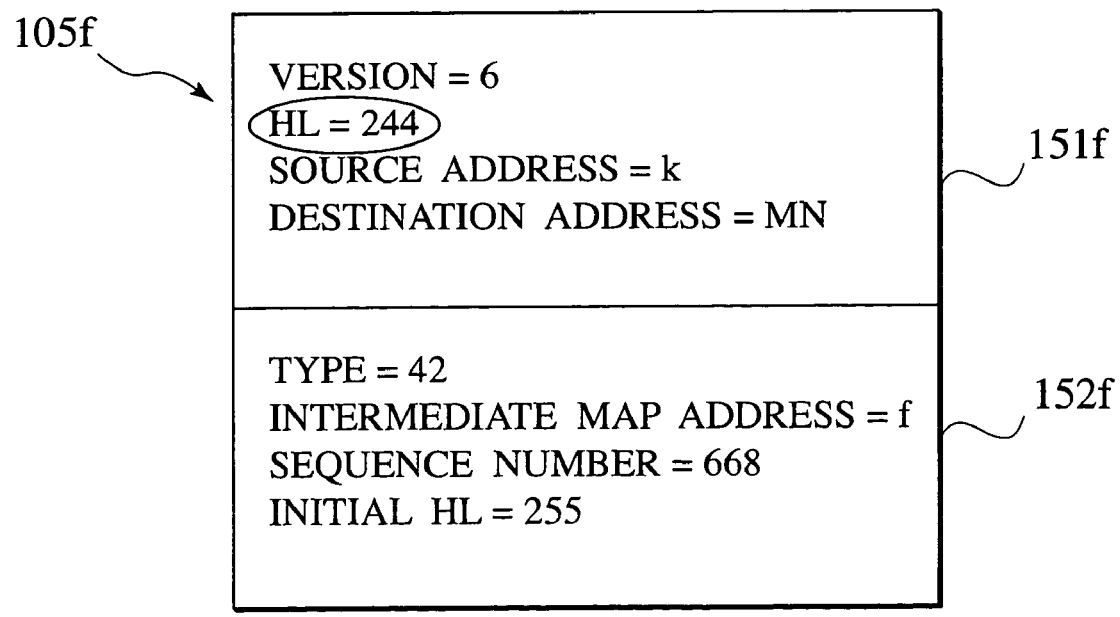
Figure 20:
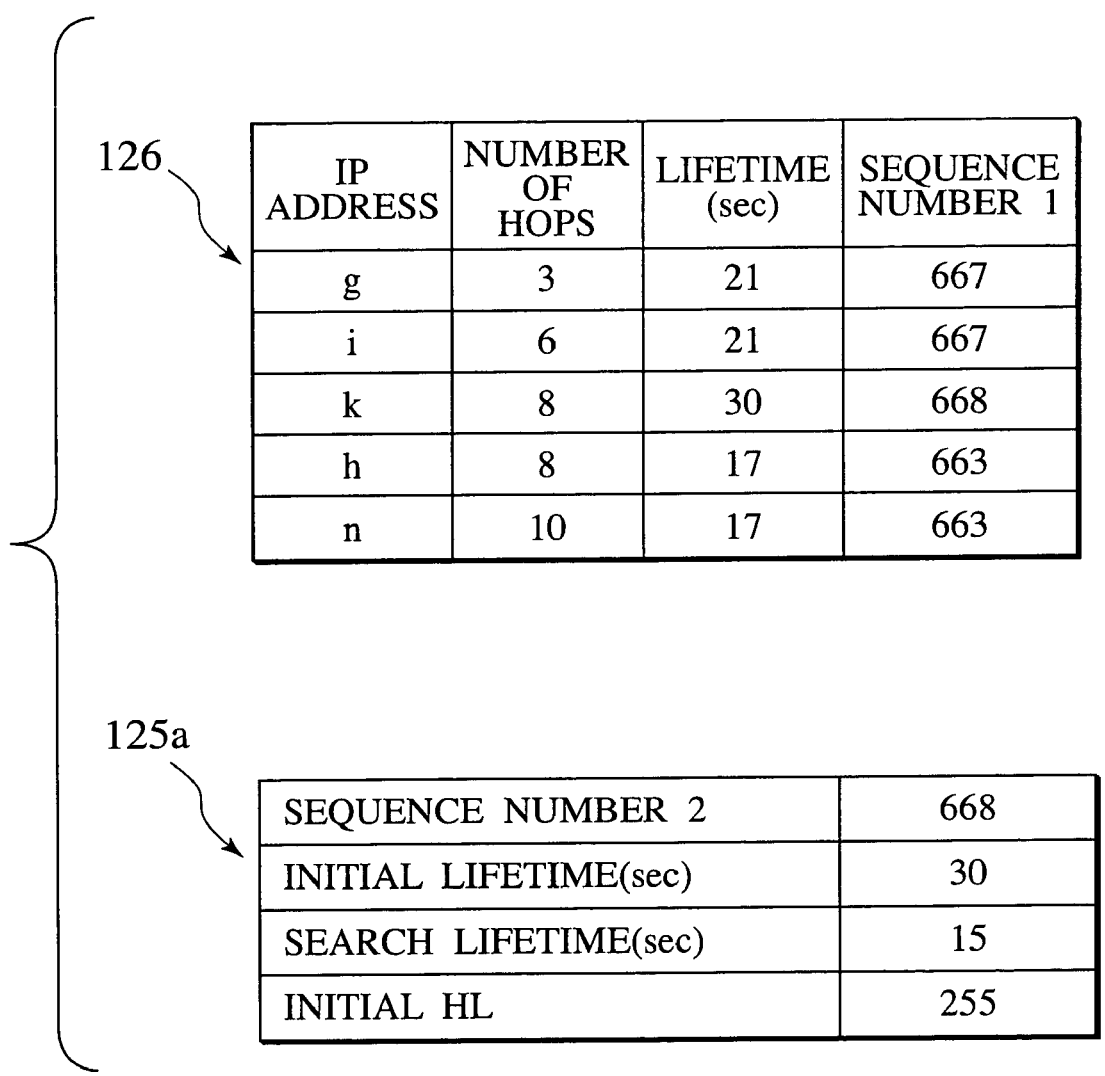
FIG. 20 is a diagram showing a neighbor MAP table and a second table in a MN when receiving a MAP notification packet according to the second embodiment of the present invention.

Subsequently, the NMDP unit 25 in the MN 120 retrieves to determine whether the intermediate MAP address "i" in the MAP notification packet 105*i* is included in the IP addresses in the neighbor MAP table 126 shown in FIG. 20. FIG. 20 shows the state of the neighbor MAP table 126 and second table 125*a* in the MN 120 when the MN 120 has received the MAP notification packet 105*i*, 105*f* shown in FIG. 19A and 19B. In the neighbor MAP table 126 and second table 125*a* shown in FIG. 20, there are places already updated from the state immediately before the MAP search is started shown in FIG. 16.

If the intermediate MAP address "i" in the newly received MAP notification packet 105*i* exists in the neighbor MAP table 126, then the NMDP unit 25 in the MN 120 determines that the MAP(i) 110*i* which the MAP notification packet 105*i* has been passed through is an already detected MAP. In this case, therefore, the NMDP unit 25 in the MN 120 determines that the MAP notification packet 105*i* should be used to update the information concerning the MAP(i) 110*i* already stored as a neighbor MAP. In the case of FIG. 20, the intermediate MAP address "i" is included in the IP addresses in the neighbor MAP table 126. Therefore, the NMDP unit 25 in the MN 120 determines that the MAP notification packet 105*i* should be used to update the information concerning the MAP(i) 110*i*.

Subsequently, the NMDP unit 25 in the MN 120 determines whether update of existing information concerning the MAP(i) 110*i* in the neighbor MAP table 126 based on the received MAP notification packet 105*i* should be executed. Specifically, the NMDP unit 25 in the MN 120 compares the sequence number "668" in the received MAP notification packet 105*i* with the sequence number 1 "667" for the MAP(i) 110*i* in the neighbor MAP table 126 (FIG. 20) when the MAP notification packet 105*i* is received. When the sequence number in the MAP notification packet 105*i* is higher, then the NMDP unit 25 in the MN 120 determines that the information based on the MAP notification packet 105*i* is the latest information and update of the information should be executed. In the case of FIG. 20, the sequence number in the MAP notification packet 105*i* is higher. Therefore, the NMDP unit 25 in the MN 120 determines that the update of the information should be executed. On the other hand, when the sequence number in the MAP notification packet 105*i* is lower than the sequence number 1 for the MAP(i) 110*i* in the neighbor MAP table 126, then the NMDP unit 25 in the MN 120 determines that update of the information should not be executed.

Subsequently, the NMDP unit 25 in the MN 120 executes update of information concerning the MAP(i) 110*i* in the neighbor MAP table 126. The NMDP unit 25 in the MN 120 acquires the sequence number "668" from the MAP notification packet 105*i* (FIG. 19A). The NMDP unit 25 in the MN 120 acquires the initial lifetime "30" from the second table 125*a* (FIG. 20). The NMDP unit 25 in the MN 120 conducts updating so as to have the latest information by replacing the existing number of hops "6" concerning the MAP(i) 1101 in the neighbor MAP table 126 (FIG. 20) with the decided number of hops "6", replacing the existing lifetime "21" with the acquired initial lifetime "30", and replacing the existing sequence number 1 "667" with the acquired sequence number "668".

Next, the case where the MAP(f) 110*f* has transmitted the MAP notification packet 105*f* will now be described. The MN 120 receives the MAP notification packet 105*f* shown in FIG. 19B. The MN 120 determines the number of hops between the MAP(f) 110*f* serving as a peripheral transfer device, which the MAP notification packet 105*f* is passed through (a MAP having an address stored in the intermediate MAP address in the MAP notification packet 105*f*) and the MN 120. Specifically, the NMDP unit 25 in the MN 120 acquires a value "244" of the HL included in the IPv6 header 151*f* and a value "255" of the initial HL included in the destination option header 152*f* from the received MAP notification packet 105*f*.

The NMDP unit 25 in the MN 120 conducts a calculation for subtracting the value "244" of HL from the value "255" of the acquired initial HL, and thereby obtains the number of hops between the MAP(f) 110*f* and MN 120. The result of the calculation becomes 255−244=11. In this way, the number of hops between the MAP(f) 110*f* and MN 120, which is decided in the MN 120, becomes "11".

Subsequently, the NMDP unit 25 in the MN 120 retrieves to determine whether the intermediate MAP address "f" in the MAP notification packet 105*f* is included in the IP addresses in the neighbor MAP table 126 shown in FIG. 20. When the intermediate address "f" in the newly received MAP notification packet 105*f* does not exist in the neighbor MAP table 126, then the NMDP unit 25 in the MN 120 determines that the MAP(f) 110*f* which the MAP notification packet 105*f* has been passed through is a newly detected MAP. In other words, the NMDP unit 25 in the MN 120 determines that there is a possibility that the MAP(f) 10*f* is newly registered in the neighbor MAP table 126 in the MN 120, as a neighbor MAP for the MN 120. In the case of FIG. 20, the intermediate address "f" in the newly received MAP notification packet 105*f* is not included in the IP addresses in the neighbor MAP table 126. Therefore, the NMDP unit 25 determines that the MAP(f) 110*f* is a newly detected MAP.

Subsequently, the NMDP unit 25 determines whether the detected MAP(f) 10*f* should be newly recorded in the neighbor MAP table 126 as a neighbor MAP for the MN 120. First, the NMDP unit 25 compares to determine whether the number of hops between the MAP(f) 110*f* and MN 120 determined based on the MAP notification packet 105*f* is smaller than the greatest number of hops of the neighbor MAPs stored in the neighbor MAP table 126 in the MN 120 when the MAP notification packet 105*f* has been received. When the number of hops of the MAP(f) 110*f* is greater than or equal to the greatest number of hops in the neighbor MAP table 126, then the NMDP unit 25 determines that the MAP(f) 110*f* should not be newly registered in the neighbor MAP table 126, as a neighbor MAP for the MN 120. In the case of FIG. 20, the determined number of hops "11" of the MAP(f) 110*f* is greater than or equal to the greatest number of hops in the neighbor MAP table 126. Therefore, the NMDP unit 25 determines that the MAP(f) 110*f* should not be newly recorded in the neighbor MAP table 126. In this case, the NMDP unit 25 does not update the neighbor MAP table 126 based on the MAP notification packet 105*f*.

On the other hand, when the number of hops between the MAP(f) 110*f* of and MN 120 is smaller than the greatest number of hops in the neighbor MAP table 126 in the MN 120 when the MAP notification packet 105*f* has been received, then the NMDP unit 25 in the MN 120 determines that the MAP(f) 110*f* should be newly recorded in the neighbor MAP table 126, as a neighbor MAP for the MN 120. The NMDP unit 25 in the MN 120 erases information concerning a neighbor MAP having the greatest number of hops in the neighbor MAP table 126. Further, the NMDP unit 25 updates the neighbor MAP table 126 based on the MAP notification packet 105*f*.

Specifically, the NMDP unit 25 in the MN 120 acquires the intermediate MAP address and sequence number from the MAP notification packet 105*f*, and acquires the initial lifetime from the second table 125*a*. The NMDP unit 25 stores the decided number of hops, the acquired intermediate MAP address, initial lifetime and sequence number in the neighbor MAP table 126, as information concerning the MAP(f) 110*f*. In this way, the MAP(f) 110*f*, which is a newly detected neighbor MAP for the MN 120, is registered in the neighbor MAP table 126.

While the search for and detection of a MAP performed by the MN 120 have been described above, the MAP(a) 110*a* to MAP(n) 110*n* can also search for and detect other MAPs in the same way as the search for and detection of a MAP performed by the MN 120. Incidentally, the initial HL in the second table 115*a* is set to the greatest number of hops of the neighbor MAPs stored in the neighbor MAP table 116*k* as shown in FIG. 15. In other words, in the case of the MAP(a) 110 to MAP(n) 110*n*, the initial HL is set to the greatest number of hops of the neighbor MAPs stored in each of the neighbor MAP tables 116*a* to 116*n*. As a result, before the MAP notification packet arrives at the MAP which has transmitted the MAP query packet, the value of HL in the MAP notification packet is decreased by 1 every transfer and may become 0. In other words, on the route between the MAP serving as a peripheral transfer device and the MAP, which has transmitted the MAP, query packet, the MAP notification packet may disappear and not arrive at the MAP, which has transmitted the MAP query packet. In this case, update of the neighbor MAP table 116*a* to 116*k* based on the MAP notification packet is not conducted in the MAP which has transmitted the MAP query packet.

As a result, the MAP notification packet transmitted from the MAP serving as a peripheral transfer device that is located so far away and may not be registered in the neighbor MAP tables 116*a* to 116*k*, can be extinguished on the route between the MAP serving as a peripheral transfer device and the MAP which has transmitted the MAP query packet. In other words, the MAP that is greater in number of hops than the neighbor MAPs in the current neighbor MAP tables 116*a* to 116*k* is not registered in the neighbor MAP tables 116*a* to 116*k*. It is possible to extinguish the MAP notification packet transmitted from such a MAP without being them received by the MAP, which has transmitted the MAP query packet. Therefore, the control load of the MAP, which has transmitted the MAP query packet can be reduced, and the transfer of extra packets can be prevented.

3. Movement of MN

As to how the MN 120 searches for and detects a MAP while moving on a movement route indicated by an arrow D in FIG. 21 will now be described. First, the MN 120 is in a position indicated by an arrow A in FIG. 21. When the lifetime of the information concerning any of the MAPs in the neighbor MAP table 126 in the MN 120 reaches the search lifetime, then the MN 120 starts a search for a MAP. The MN 120 transmits a MAP query packet to the MAP. Subsequently, the MN 120 receives a MAP notification packet in response to the MAP query packet returned via a MAP that has become a peripheral transfer device. The NMDP unit 25 detects a new MAP, and updates the neighbor MAP table 126, based on the received MAP notification packet. As a result, information concerning neighbor MAPs having small number of hops between the MAPs and the MN 120 located in the position indicated by the arrow A in FIG. 21, is recorded in the neighbor MAP table 126 in the order of increasing number of hops as MAP(g) 110g, MAP(i) 110i, MAP(k) 110k, MAP(h) 110h and MAP(n) 110n.

As shown in FIG. 16, the initial lifetime and search lifetime stored in the second table 125a of the MN 120 are set to short time values. While the MN 120 moves on the movement route indicated by the arrow D from the position indicated by the arrow A to a position indicated by an arrow C via a position indicated by an arrow B in FIG. 21, the lifetime values for information concerning neighbor MAPs in the neighbor MAP table 126 reaches the search lifetime one after another, and the MN 120 searches for a MAP repetitively.

Figure 21:
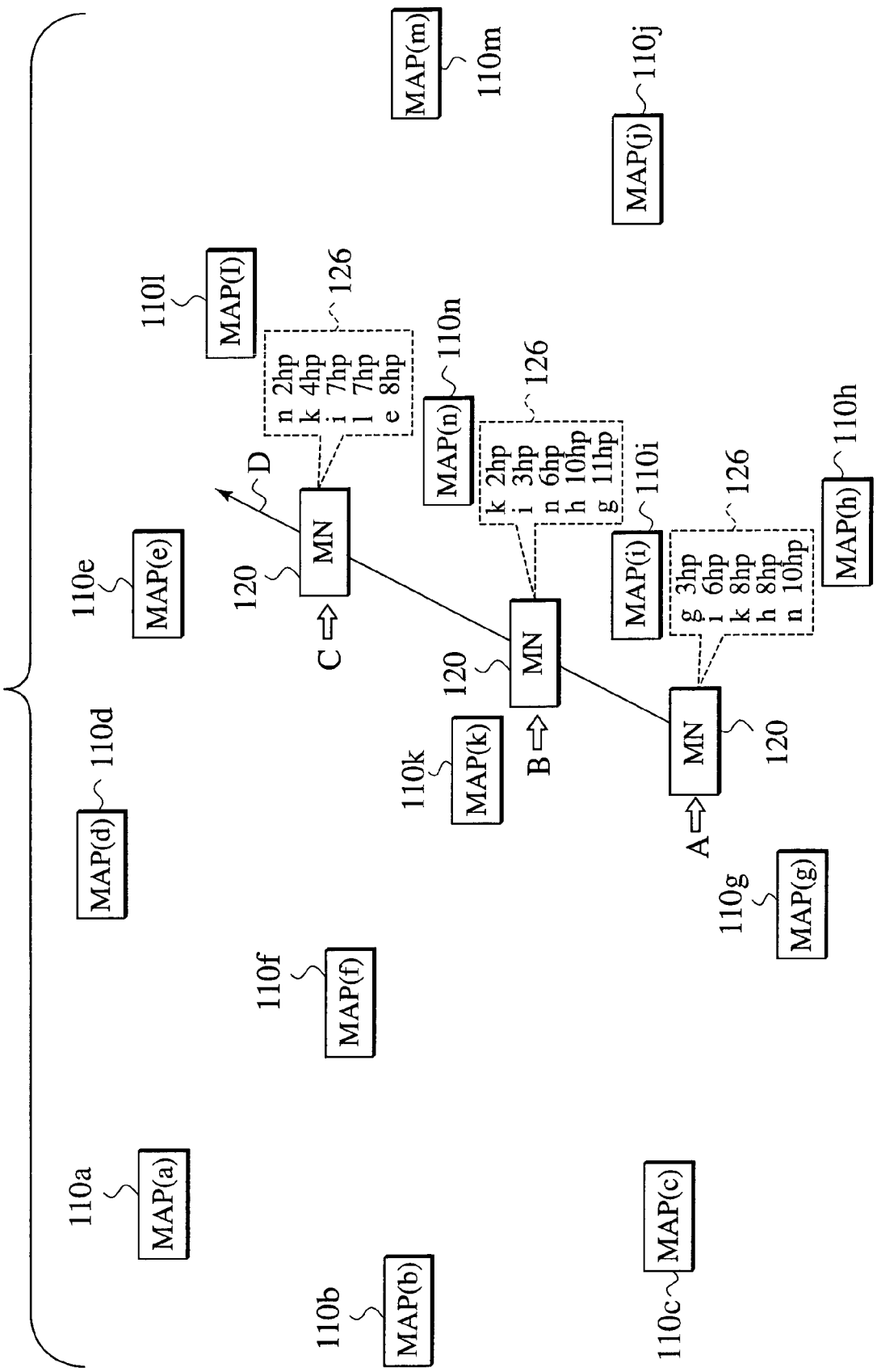
FIG. 21 is a diagram showing the state of movement of a MN according to the second embodiment of the present invention.

In the position indicated by the arrow B in FIG. 21, therefore, information concerning neighbor MAPs having small number of hops between MAPs and the MN 120 located in the position indicated by the arrow B in FIG. 21, is recorded in the neighbor MAP table 126 in the order of increasing number of hops as MAP(k) 110k, MAP(i) 110i, MAP(n) 110n, MAP(h) 110h and MAP(g) 110g. Furthermore, in the position indicated by the arrow C in FIG. 21, information concerning neighbor MAPs having small number of hops between MAPs and the MN 120 located in the position indicated by the arrow C in FIG. 21, is recorded in the neighbor MAP table 126 in the order of increasing number of hops as MAP(n) 110n, MAP(k) 110k, MAP(i) 110i, MAP(l) 110l and MAP(e) 110e.

(Selection of MAP)

Selection of a MAP will now be described by taking a case where the MN 120 has the neighbor MAP table 126 shown in FIG. 16, as an example. The NMDP unit 25 in the MN 120 first acquires a MAP selection policy represented as "a MAP located nearest (a MAP having a minimum number of hops between the MAP and MN)" from the MAP selection policy storage unit 25b.

Subsequently, the NMDP unit 25 compares the information concerning neighbor MAPs stored in the neighbor MAP table 126 shown in FIG. 16 with the MAP selection policy acquired from the MAP selection policy storage unit 25b, and selects an optimum MAP satisfying the MAP selection policy. As a result, the NMDP unit 25 selects the MAP(g) 110g as the MAP to be used for transfer of packets. The NMDP unit 25 notifies the mobility management unit 24 of the address of the selected MAP(g) 110g. The mobility management unit 24 creates a binding update packet or buffering request packet to be transmitted to the MAP(g) 110g notified by the NMDP unit 25. Finally, the interface 29 transmits the binding update packet or buffering request packet to the MAP (g) 110g.

According to the mobile communication system, MAP(a) 110a to MAP(n) 110n, MN 120, and mobile communication method of the second embodiment as described above, the following effects can be obtained in addition to the effects obtained by the mobile communication system 1, MAP 10, MN 20, and mobile communication method according to the first embodiment.

The NMDP unit 15 in the MAP(a) 110a to MAP(n) 110n creates a MAP notification packet to be passed through the MAPs serving as peripheral transfer devices other than the query packet reception transfer device, which has received the MAP query packet transmitted from the MN 120. Therefore, the MAP notification packet can also include information concerning the MAPs which are peripheral transfer devices which the MAP notification packet is passed through. As a result, the MAP(a) 110a to MAP(n) 110n can also provide the MN 120 with information concerning the MAPs, which have become peripheral transfer devices.

[Variations]

The present invention is not limited to the embodiments described above, and various variations are possible.

(First Variation)

In the embodiments described above, a MAP notification packet including transfer device information, such as the delay value, the number of hops and the processing capability, is used. A MAP that has become a query packet reception transfer device or a peripheral transfer device may create a MAP notification packet including an IP address of a neighbor MAP stored in its own neighbor MAP table, and return the MAP notification packet to a MAP or MN which has transmitted the query packet. In this case too, the MAP or MN which has transmitted the query packet can grasp an IP address of other MAPs, detect MAPs, and register the detected MAPs in the neighbor MAP table. In addition, it is possible to reduce the information included in the MAP notification packet, and make the packet transmission and packet processing more efficient.

In this case, the MAP or MN, which has transmitted the query packet transmits a ping (Packet Internet Groper) request for investigation of the delay value or the number of hops to an IP address of the MAP detected on based on the MAP notification packet. Upon receiving the ping request, the detected MAP returns a ping response in response to the ping request. Upon receiving the ping response, the MAP or MN, which has transmitted the query packet updates the neighbor MAP table based on the received ping response.

In this case, the NMDP unit 15 in the MAP or the NMDP unit 25 in the MN functions as a data creation unit, which creates a ping request as data for investigating transfer device information, and to be transmitted to the MAP detected by the NMDP unit 15 or 25. The interface 19 or 29 functions as the communication unit, which transmits a ping request created by the NMDP unit 15 or 25, and receives a ping response as response data returned from the detected MAP, in response to the ping request.

In this way, by using the ping request and ping response, the MAP or MN which has transmitted the query packet can also grasp the transfer device information concerning the detected MAP. Furthermore, by receiving a ping response depending upon the situation at the time of transmission of the ping request, the MAP or MN, which has transmitted the query packet can grasp the transfer device information depending upon the situation at that time.

Furthermore, after the MAP or MN has registered a MAP in the neighbor MAP table as a neighbor MAP, the MAP or MN can investigate the transfer device information, such as the delay value and the number of hops between the MAP or MN and an already detected neighbor MAP, as occasion demands by using the data for investigating the transfer device information and its response data, such as the ping request and ping response. Further, the MAP or MN can update the neighbor MAP table based on the transfer device information, and store the latest information.

(Second Variation)

In the embodiments described above, IPv6 is used. However, IPv4 can also be used. In the case where IPv4 is used, a packet obtained by storing information stored in the destination option header of a MAP query packet, MAP notification initiator packet, or MAP notification packet, in a data part of an IPv4 packet is used. Using the port number in the UDP header indicates the kind of the packet indicated by the type in the destination option header.

Figure 22:
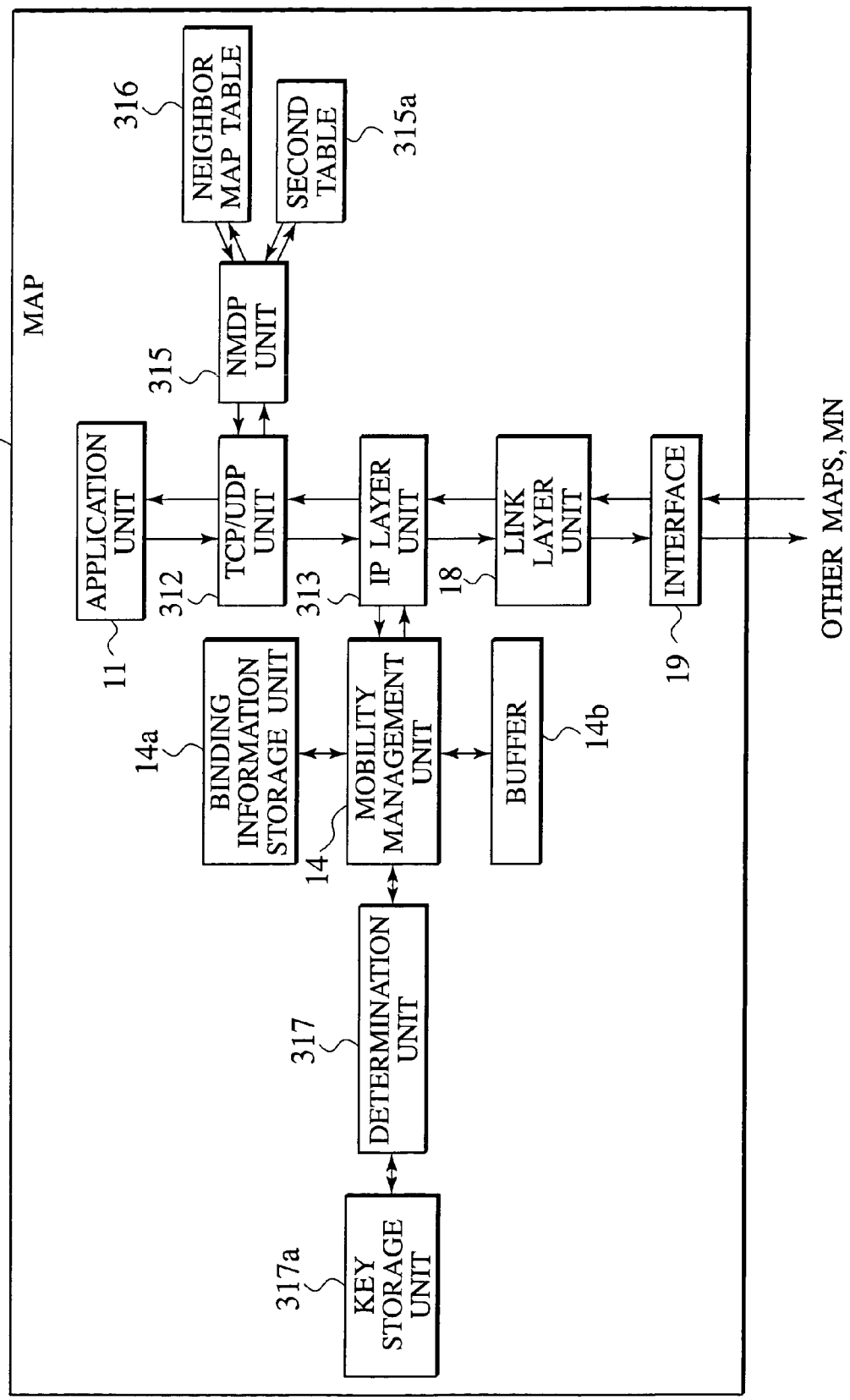
FIG. 22 is a block diagram showing a configuration of a MAP according to a variation of the present invention.

FIG. 22 shows a configuration of a MAP 310 in the case where IPv4 is used. The MAP 310 comprises an application unit 11, a TCP/UDP unit 312, an IP layer unit 313, a mobility management unit 14, a binding information storage unit 14a, a buffer 14a, an NMDP unit 315, a neighbor MAP table 316, a second table 315a, a determination unit 317, a key storage unit 317a, a link layer unit 18 and an interface 19. Parts substantially the same as those in the MAP 10 shown in FIG. 2 have identical reference numerals and the description thereof will be omitted.

The key storage unit 317a is a data storage unit configured to store common data, which is commonly assigned to the MNs allowed to use packet transfer. A user of the MN acquires the common data such as a key which is commonly assigned to the MNs allowed to use packet transfer when the user makes a contract with Carrier A for using the mobility management service. The key storage unit 317a stores, for example, a key, as the common data, which is commonly assigned only to the MNs allowed to use packet transfer.

The determination unit 317 acquires from the mobility management unit 14 a packet concerning mobility management such as a binding update packet or buffering request packet, which has been transmitted from the MN and received by the interface 19. The determination unit 317 determines whether the received packet is a packet from a MN allowed to use packet transfer performed by the MAP, based on the whether data such as a key included in the binding update packet or buffering request packet acquired from the mobility management unit 14 coincides with the common data such as a key stored in the key storage unit 317a.

At this time, the binding update packet or buffering request packet received by the interface 19 may include the common data such as a key as it is, or may include a result of calculation using an address such as a home address, LCoA or RCoA of the MN, and the common data such as a key. Therefore, if the calculation result is included in the binding update packet or buffering request packet, the determination unit 317 conducts an operation for taking out the common data such as a key from the calculation result. Further, the determination unit 317 compares the common data such as a key obtained by the operation with the common data such as a key stored in the key storage unit 317a.

As a result of comparing the data included in the binding update packet or buffering request packet acquired from the mobility management unit 14, with the common data stored in the key storage unit 317a, when they coincide with each other, the determination unit 317 determines that the received packet is a packet from a MN allowed to use packet transfer performed by the MAP. In this case, the determination unit 317 returns to the mobility management unit 14 the binding update packet or buffering request packet acquired from the mobility management unit 14. On the other hand, as a result of the comparing, when they do not coincide with each other, the determination unit 317 determines that the received packet is not a packet from a MN 20 allowed to use packet transfer performed by the MAP. In this case, the determination unit 317 discards the binding update packet or buffering request packet acquired from the mobility management unit 14.

Consequently, the MAP 310 can easily determine whether a received packet is a packet from a MN allowed to use packet transfer performed by the MAP, by storing common data which is commonly assigned only to the MNs allowed to use packet transfer and comparing it with the data included in the received packet. In addition, the key storage unit 317a has only to store the common data, and does not need to store information concerning all the MNs allowed to use packet transfer. Therefore, pressure on the storage capacity in the MAP can be prevented.

The TCP/UDP unit 312 acquires a MAP notification packet for notifying the address of the MAP 10, a MAP notification initiator packet or a MAP query packet from the IP layer unit 313, and inputs the packet to the NMDP unit 315. The TCP/UDP unit 312 acquires a MAP notification packet, MAP notification initiator packet or MAP query packet from the NMDP unit 315, and inputs the packet to the IP layer unit 313. The TCP/UDP unit 312 determines the kind of the packet based on a port number in a TCP header of the packet. Except for these points, the TCP/UDP unit 312 is substantially the same as the TCP/UDP unit 12 of the MAP 10 shown in FIG. 2.

The NMDP unit 315 inputs a MAP notification packet for notifying of the address of the MAP, a MAP notification initiator packet or a MAP query packet to the TCP/UDP unit 312, and acquires the same from the TCP/UDP unit 312. Furthermore, the NMDP unit 315 acquires information from the neighbor MAP table 316 and second table 315a, and updates information in the neighbor MAP table 316 and second table 315a. Thus, the NMDP unit 315 is substantially the same as the NMDP unit 15 in the MAP 10 shown in FIG. 2 except that the processing is conducted at the TCP/UDP level. The neighbor MAP table 316 and second table 315a are substantially the same as the neighbor MAP table 16 and second table 15a in the MAP 10 shown in FIG. 2 except that they are used in processing conducted at the TCP/UDP level. The IP layer unit 313 is substantially the same as the IP layer unit 13 shown in FIG. 2 except that the IP layer unit 313 does not input packets to and receive packets from the NMDP unit 315.

Figure 23:
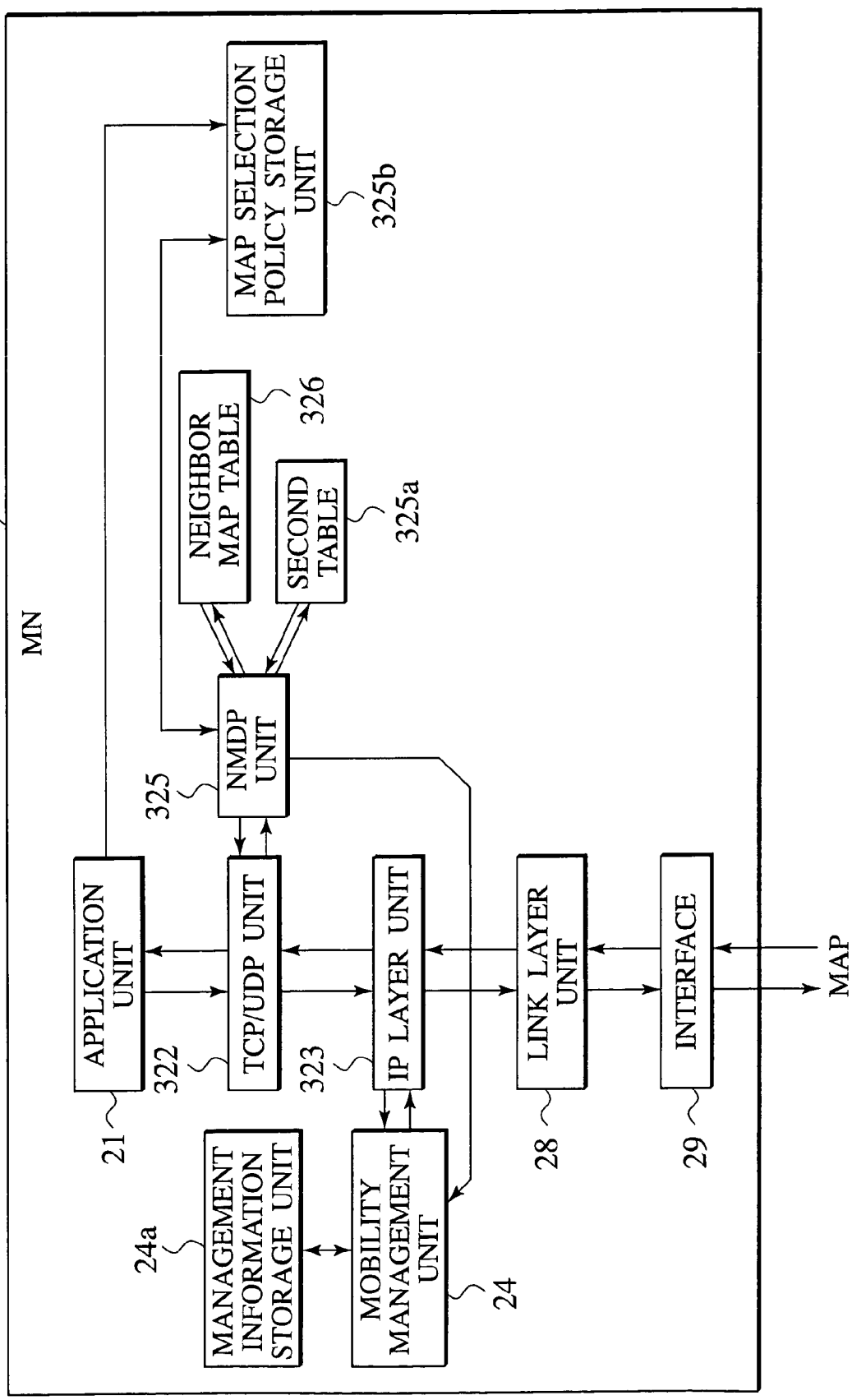
FIG. 23 is a block diagram showing a configuration of a MN according to the variation of the present invention.

FIG. 23 shows a configuration of a MN 320 in the case where IPv4 is used. The MN 320 comprises an application unit 21, a TCP/UDP unit 322, an IP layer unit 323, a mobility management unit 24, a management information storage unit 24a, an NMDP unit 325, a neighbor MAP table 326, a second table 325a, a MAP selection policy storage unit 325b, a link layer unit 28 and an interface 29. Parts substantially the same as those in the MN 20 shown in FIG. 3 have identical reference numerals and the description thereof will be omitted.

The TCP/UDP unit 322 acquires a MAP notification packet from the IP layer unit 323, and supplies the packet to the NMDP unit 325. The TCP/UDP unit 322 acquires a MAP query packet from the NMDP unit 325, and inputs the packet to the IP layer unit 323. The TCP/UDP unit 322 determines the kind of the packet based on a port number in a TCP header of the packet. Except for these points, the TCP/UDP unit 322 is substantially the same as the TCP/UDP unit 22 of the MN 20 shown in FIG. 3.

The NMDP unit 325 supplies a MAP query packet to the TCP/UDP unit 322, and acquires a MAP notification packet from the TCP/UDP unit 322. Furthermore, the NMDP unit 325 acquires information from the neighbor MAP table 326, second table 325a and MAP selection policy storage unit 325b, and updates information in the neighbor MAP table 326 and second table 325a. Thus, the NMDP unit 325 is substantially the same as the NMDP unit 25 in the MN 20 shown in FIG. 3 except that the processing is conducted at the TCP/UDP level. The neighbor MAP table 326, second table 325a and MAP selection policy storage unit 325b are substantially the same as the neighbor MAP table 26, second table 25a and MAP selection policy storage unit 25b in the MN 20 shown in FIG. 3 except that they are used in processing conducted at the TCP/UDP level. The IP layer unit 323 is substantially the same as the IP layer unit 23 shown in FIG. 3 except that the IP layer unit 323 does not input packets to and receive packets from the NMDP unit 325.

(Third Variation)

In peripheral transfer devices, there is a MAP directly neighboring a MAP serving as the query packet reception transfer device, and a MAP indirectly neighboring the MAP serving as the query packet reception transfer device. For example, denoting a MAP directly neighboring a MAP serving as the query packet reception transfer device by first neighbor MAP, a second neighbor MAP directly neighboring the first neighbor MAP and a third neighbor MAP directly neighboring the second neighbor MAP become MAPs indirectly neighboring the MAP serving as the query packet reception transfer device.

In the embodiments described above, upon receiving a MAP notification initiator packet, a MAP serving as a peripheral transfer device directly neighboring a MAP serving as the query packet reception transfer device simply transmits a MAP notification packet. However, a MAP serving as a peripheral transfer device directly neighboring a MAP serving as the query packet reception transfer device may further transmit a MAP notification initiator packet to a MAP having an address stored in its own neighbor MAP table. As a result, a MAP or MN, which has transmitted a query packet can also receive a MAP notification packet from a MAP serving as a peripheral transfer device indirectly neighboring a query packet reception transfer device. In the same way, upon receiving a MAP notification initiator packet, a MAP may create a MAP notification initiator packet and transmit the MAP notification initiator packet to a MAP having an address stored in the neighbor MAP table in the MAP. This operation may be repeated one after another.

Furthermore, upon receiving a MAP notification packet, a MAP existing on a route which the MAP notification packet is passed through may create a MAP notification packet that includes information concerning a MAP stored in its own neighbor MAP table, and transmit the MAP notification packet to a MAP or MN which has transmitted the query packet. Or upon receiving a MAP notification packet, a MAP existing on a route which the MAP notification packet is passed through may store information concerning a MAP stored in its own neighbor MAP table, in the received MAP notification packet.

In this way, each MAP may transmit a packet concerning a MAP search or MAP notice to a MAP neighboring itself, and propagation to the surrounding MAPs may be conducted by repeating this operation. As a result, each MAP can grasp information concerning a larger number of MAPs.

NMDP unit 15 can create a notification packet or notification initiator packet in either case where the interface 19 has received a MAP query packet for searching for a MAP from the MN, where the interface 19 has received a MAP notification packet from other MAPs, or where the interface 19 has received a MAP notification initiator packet from other MAPs.

(Fourth Variation)

The method for deciding a delay value and the number of hops between a MAP and MN or between a MAP and other MAPs is not limited to that in the embodiments described above. In the embodiments described above, a MAP or MN which has transmitted a query packet decides inter-mobile-terminal information or inter-transfer-device information between the MAP or MN itself which has transmitted the query packet and a MAP serving as a peripheral transfer device, based on a delay value between the MAP or MN itself and a MAP serving as a query packet reception transfer device and a delay value between the MAP serving as a query packet reception transfer device and the MAP serving as the peripheral transfer device. If the MAPs are in synchronism with each other and a MAP is in synchronism with the MN, however, the delay value itself between the MAP or MN itself which has transmitted the query packet and the MAP serving as the peripheral transfer device can be measured directly. For example, when transmitting a MAP notification packet, the MAP serving as the peripheral transfer device needs only to store its transmission time in the MAP notification packet. It is also not necessary to store the search start time in a MAP query packet, MAP notification initiator packet, or MAP notification packet.

In the case where the MAPs are in synchronism with each other and a MAP is in synchronism with the MN, each MAP that exists on the route of a MAP notification packet may store its own IP address and transmission time of the MAP notification packet when it has received the MAP notification packet. In other words, each MAP may press a time stamp of transmission time on a MAP notification packet. As a result, the MAP or MN, which has transmitted the query packet can grasp information concerning a larger number of MAPs at a time.

In the case where the MAPs are in synchronism with each other and a MAP is in synchronism with the MN, the MN or MAP which has transmitted the query packet may comprise a table in which the sequence number of each MAP query packet is associated with its search start time. By accessing the table based on the sequence number in the returned MAP notification packet, the search start time can be grasped. As a result, it is not necessary to store the search start time in the MAP query packet, MAP notification initiator packet and MAP notification packet.

Also, as for the number of hops, the number of hops between the MN or MAP itself, which has transmitted the query packet and the MAP serving as the peripheral transfer device may be directly measured. Or the number of hops between the MN or MAP itself, which has transmitted the query packet and the MAP serving as the peripheral transfer device may be calculated from the numbers of hops between MAPs.

(Fifth Variation)

Information included in the MAP notification packet and information stored in the neighbor MAP table are not limited to those in the embodiments described above. The information included in the MAP notification packet and the information stored in the neighbor MAP table vary according to the remoteness/nearness decision criterion and MAP selection policy used by the mobile communication system, MAP and MN. If, apart from the delay value and the number of hops, for example, inter-mobile-terminal information and inter-transfer-device information such as the cost and link capacity, and own-transfer-device information such as traffic volume, are used as parameters for the remoteness/nearness decision criterion, then the MAP notification packet includes such inter-mobile-terminal information, inter-transfer-device information and own-transfer-device information, and the neighbor MAP table stores such inter-mobile-terminal information, inter-transfer-device information and own-transfer-device information.

If, apart from the processing capability, inter-mobile-terminal information or inter-transfer-device information such as propagation path information between MN and MAP or MAPs, and own-transfer-device information such as reliability (such as whether a mirror configuration is adopted), traffic volume, the number of MNs using the MAP, and transmission power, are used as parameters for the MAP selection policy, then the MAP notification packet includes such inter-mobile-terminal information, inter-transfer-device information and own-transfer-device information, and the neighbor MAP table stores such inter-mobile-terminal information, inter-transfer-device information and own-transfer-device information.

It is also possible that the neighbor MAP table stores a plurality of kinds of inter-mobile-terminal information, inter-transfer-device information and own-transfer-device information, and the NMDP unit changes the remoteness/nearness decision criterion to be adopted or the MAP selection policy to be used, according to the situation. A criterion used to store information by the neighbor MAP table is not limited to that in the embodiments described above, either. For example, information concerning MAPs that are less than a predetermined value in the delay value or the number of hops may be stored without setting the maximum number of node entries. Furthermore, information concerning MAPs maybe stored in the order of lifetime, or in the order determined by other transfer device information. It is desirable that the criterion according to which the neighbor MAP table of the MN stores information is set based on the MAP selection policy. By previously registering MAPs satisfying the MAP selection policy in the neighbor MAP table, a MAP to be used can be selected efficiently.

What is claimed is:

1. A transfer device managed by a first communications carrier, and that performs packet communication with other communication devices, the transfer device comprising:
   a communication unit configured to receive packets addressed to a mobile terminal connected to an access router included in an access network managed by a second communications carrier, the mobile terminal located in the access network;
   a terminal information storage unit configured to receive, from the mobile terminal, and store a binding update packet of the mobile terminal including a home address of a unique IP address of the mobile terminal which has a possibility to be a destination of packet transfer from the transfer device and includes at least either (1) a Link Care of Address (LCoA) or (2) the Link Care of Address (LCoA) and a Regional Care of Address (RCoA), the Link Care of Address including a network prefix of the access router, which is used to transfer the packets from the transfer device to the mobile terminal, and a host identity of the IP address assigned to the mobile terminal, the Regional Care of Address including a network prefix of another transfer device managed by the first communications carrier and that is located in the access network or on a boundary of the access network and a host identity of the IP address assigned to the mobile terminal;
   a binding information storage unit to (1) record binding information between the home address and LCoA of the mobile terminal, when the binding update packet includes the home address and LCoA of the mobile terminal, and (2) record binding information between the LCoA and RCoA of the mobile terminal, when the binding packet includes the LCoA and RCoA of the mobile terminal;
   a determination unit configured to determine whether the identification information of the mobile terminal included in the packets received by the communication unit corresponds to the terminal information stored in the terminal information storage unit; and
   a transfer unit configured to transfer the packets received by the communication unit to the mobile terminal connected to the access router when the determination unit determines that the identification information of the mobile terminal included in the packets received by the communication unit corresponds to the terminal information stored in the terminal information storage unit.

2. A transfer method managed by a first communications carrier, and that performs packet communication with other communication devices, the transfer method comprising:
   receiving, at a communication unit, packets addressed to a mobile terminal connected to an access router included in an access network managed by a second communications carrier, the mobile terminal located in the access network;
   receiving, from the mobile terminal, and storing in a storage unit a binding update packet of the mobile terminal including a home address of a unique IP address of the mobile terminal which has a possibility to be a destination of packet transfer from the transfer device and includes at least either a Link Care of Address (LCoA) or a Regional Care of Address (RCoA), the Link Care of Address including a network prefix of the access router, which is used to transfer the packets from the transfer device to the mobile terminal, and a host identity of the IP address assigned to the mobile terminal, the Regional Care of Address including a network prefix of another transfer device managed by the first communications carrier and that is located in the access network or on a boundary of the access network and a host identity of the IP address assigned to the mobile terminal;
   a binding information storage unit to (1) record binding information between the home address and LCoA of the mobile terminal, when the binding update packet includes the home address and LCoA of the mobile terminal, and (2) record binding information between the LCoA and RCoA of the mobile terminal, when the binding packet includes the LCoA and RCoA of the mobile terminal;
   determining whether the identification information of the mobile terminal included in the packets received by the communication unit corresponds to the terminal information stored in the terminal information storage unit; and
   transferring the packets received by the communication unit to the mobile terminal connected to the access router when it is determined that the identification information of the mobile terminal included in the packets received by the communication unit corresponds to the terminal information stored in the storage unit.

* * * * *